United States Patent [19]

Sugiki et al.

[11] Patent Number: 4,656,539
[45] Date of Patent: * Apr. 7, 1987

[54] METHOD AND APPARATUS WITH IMPROVED TRACKING CONTROL FOR RECORDING A DIGITAL SIGNAL

[75] Inventors: Hiraku Sugiki, Saitama; Kentaro Odaka, Kanagawa; Tomoji Satake, Chiba; Takashi Ohmori; Makoto Yamada, both of Tokyo, all of Japan

[73] Assignee: Sony Corporation, Tokyo, Japan

[*] Notice: The portion of the term of this patent subsequent to Mar. 17, 2004 has been disclaimed.

[21] Appl. No.: 693,270

[22] Filed: Jan. 22, 1985

[30] Foreign Application Priority Data

Jan. 25, 1984 [JP] Japan ................... 59-11630

[51] Int. Cl.$^4$ .................. G11B 5/584; G11B 5/09; G11B 15/46
[52] U.S. Cl. .................. 360/77; 360/18; 360/32
[58] Field of Search .................. 360/77, 70, 32, 27, 360/73, 18, 39, 57, 75, 10.1–10.3, 19.1, 33.1; 358/312, 323, 328

[56] References Cited

U.S. PATENT DOCUMENTS

| 4,451,860 | 5/1984 | Honjo et al. | 360/77 |
| 4,528,605 | 7/1983 | Hiraguri | 360/77 |
| 4,530,012 | 7/1985 | Kinjo | 360/77 |
| 4,544,966 | 10/1985 | Taniguchi | 360/75 |

FOREIGN PATENT DOCUMENTS

| 0113986 | 7/1984 | European Pat. Off. | 360/27 |
| 55-24406 | 2/1980 | Japan | 360/77 |
| 56-68923 | 6/1981 | Japan | 360/27 |

Primary Examiner—Raymond F. Cardillo
Assistant Examiner—Steven R. Garland
Attorney, Agent, or Firm—Lewis H. Eslinger; Alvin Sinderbrand

[57] ABSTRACT

In a system for recording and reproducing digital signals on a magnetic tape by using a rotary head, in which signals are recorded as a series of slanted tracks without guard bands, a pilot signal that controls tracking alignment of a playback head is recorded at a particular position in a specific pilot signal record region, independent from the information signal record region. The pilot signal is arranged at first predetermined positions separated from the ends of the slanted tracks in the pilot signal record region on every other one of the slanted tracks and at second predetermined positions separated from the ends of the slanted tracks in the pilot signal record region on the alternate ones of the slanted tracks. An erase signal can also be recorded in the pilot signal record region such that a start position of the erase signal corresponds substantially to a center portion of the pilot signal on the adjacent track. When the recorded tracks are reproduced by a rotary playback head having a tracing width greater than the track width, the pilot signals from the adjacent tracks will be detected and compared in level, and the comparison output used to control the tracking alignment of the rotary playback head.

14 Claims, 90 Drawing Figures

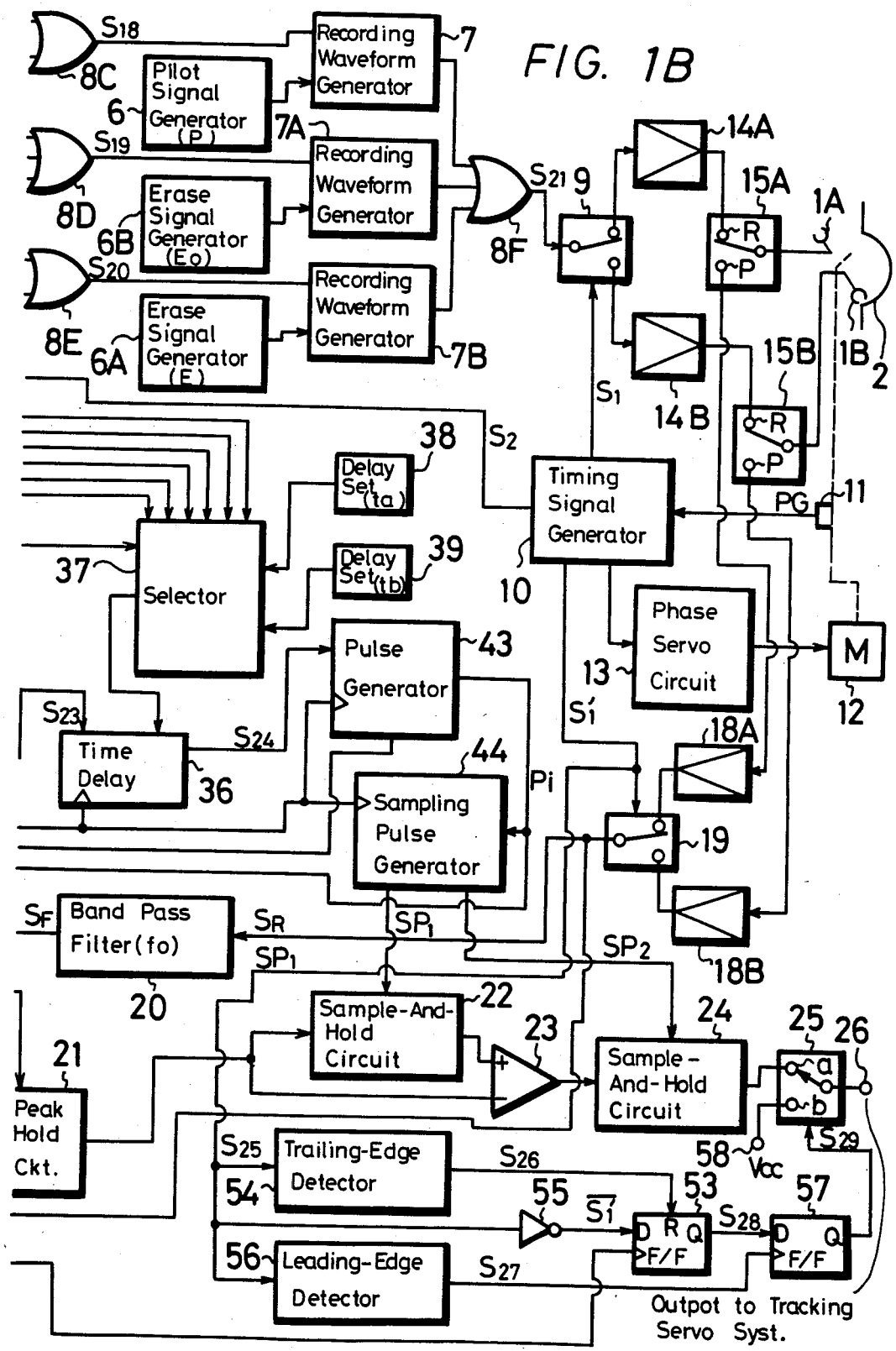

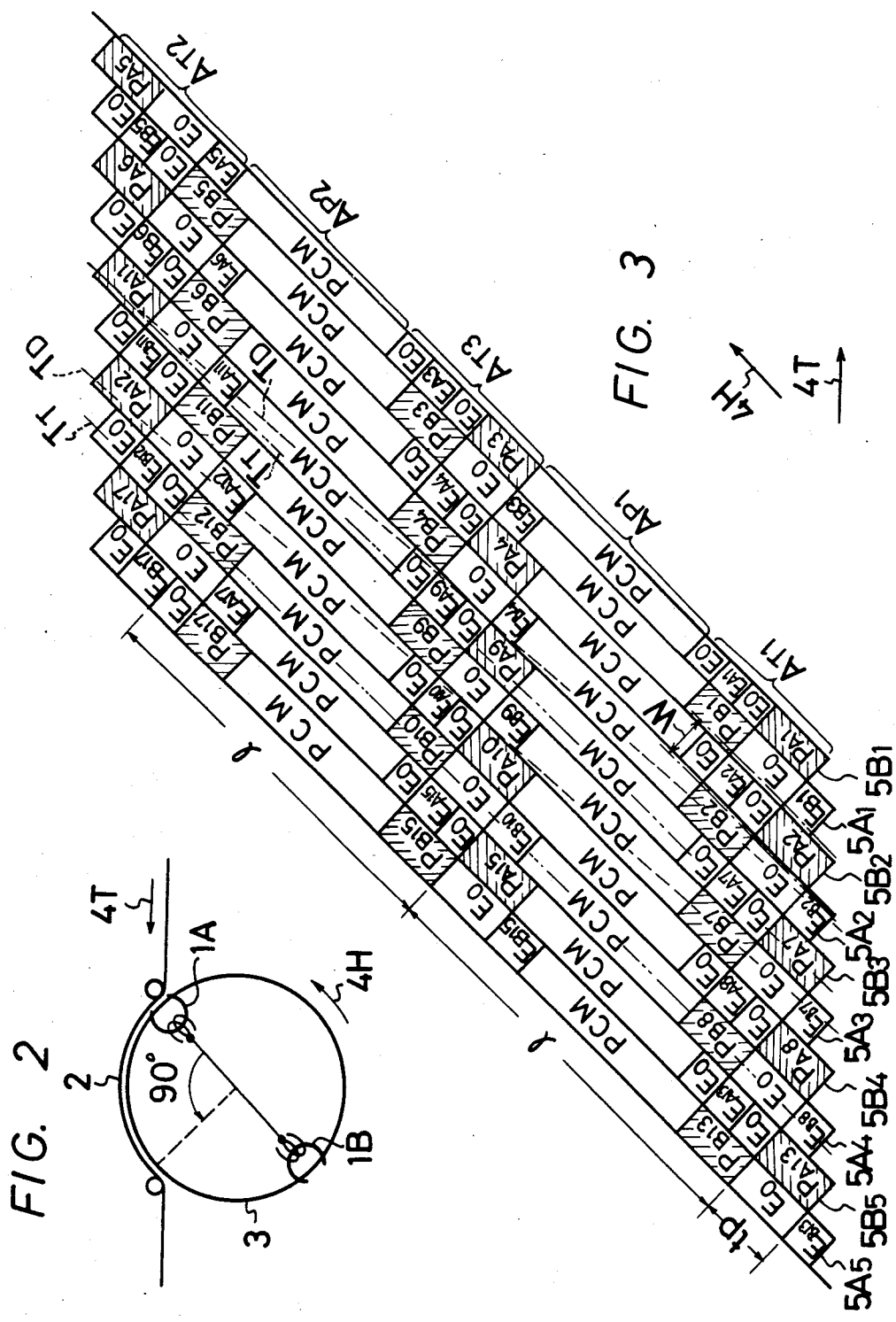

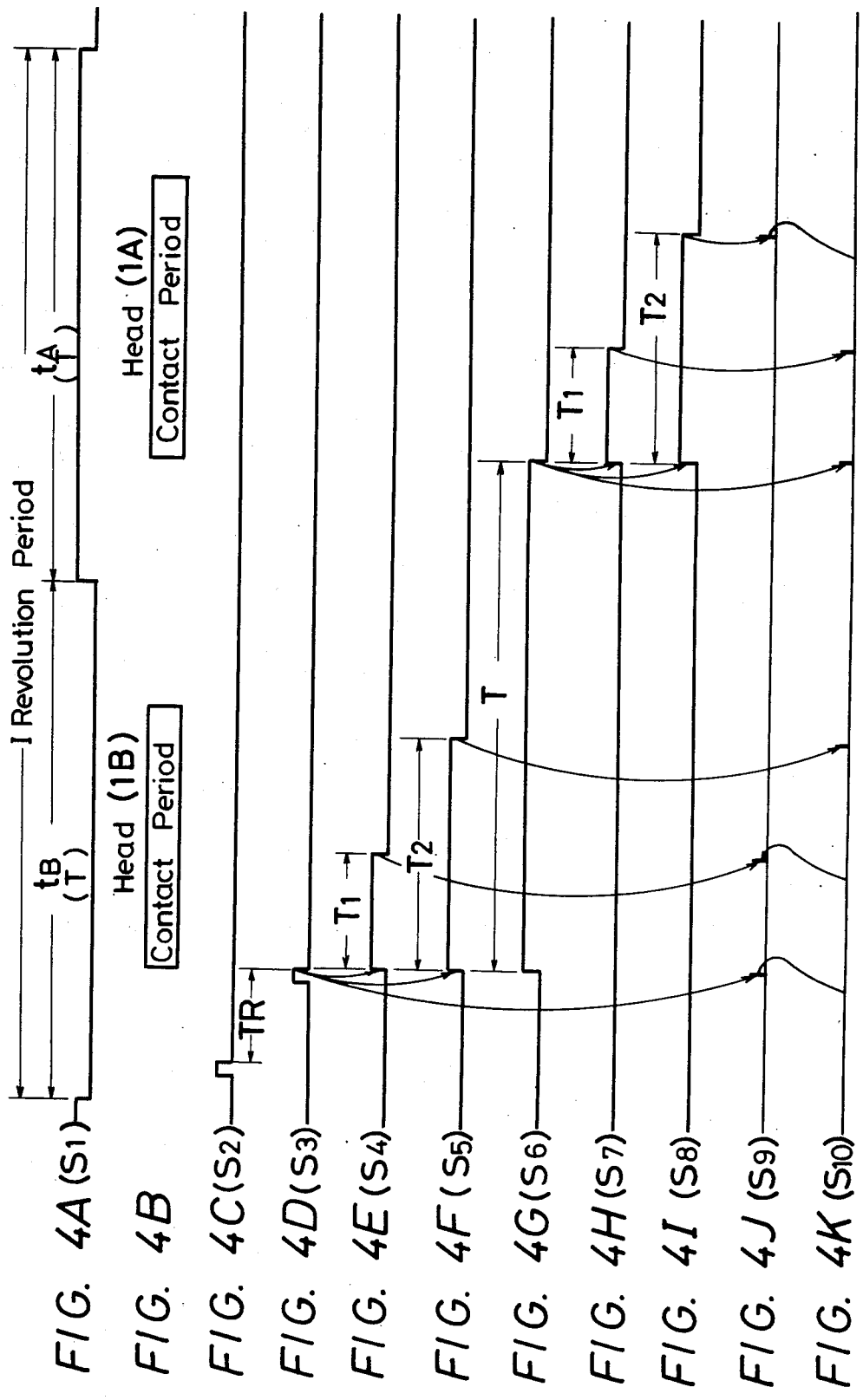

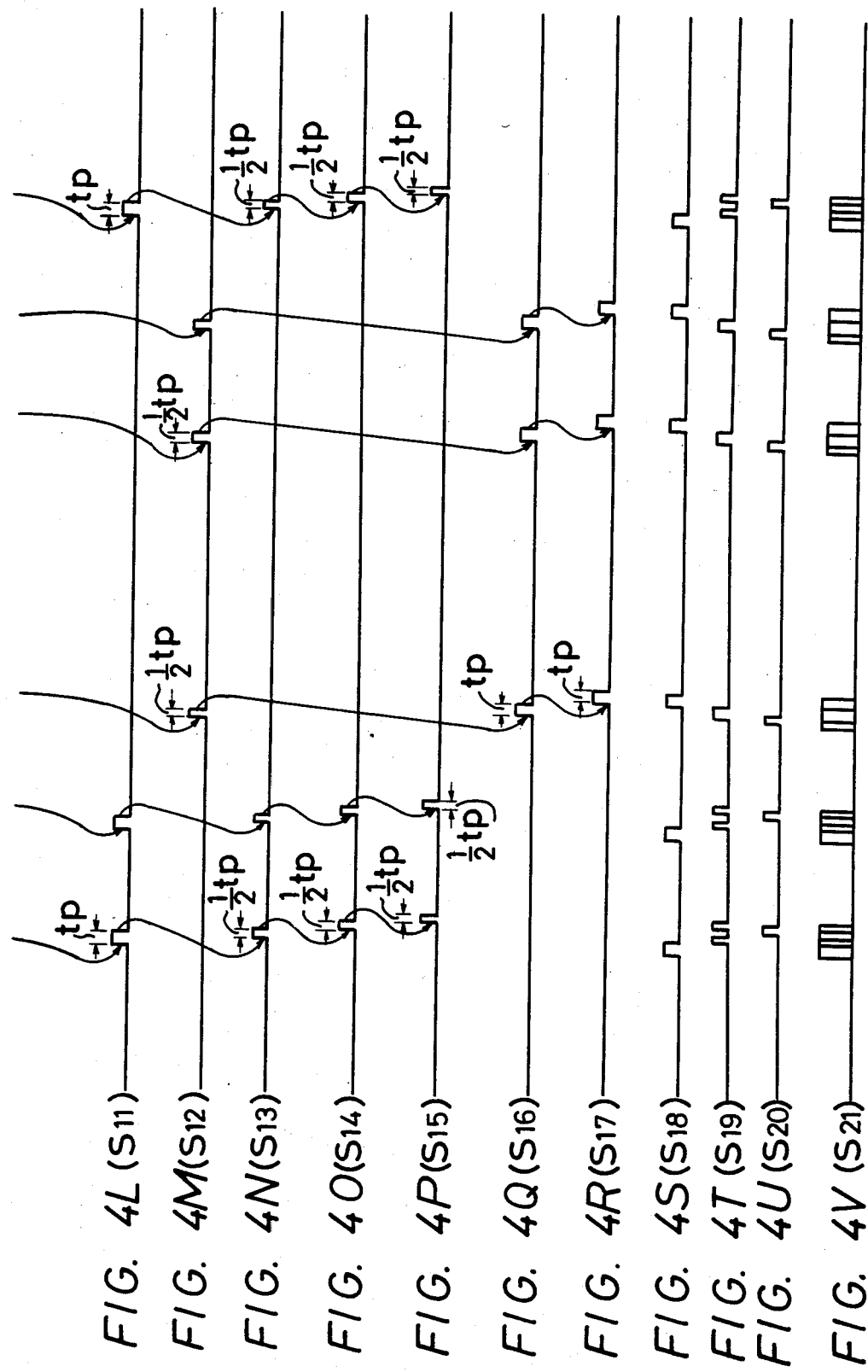

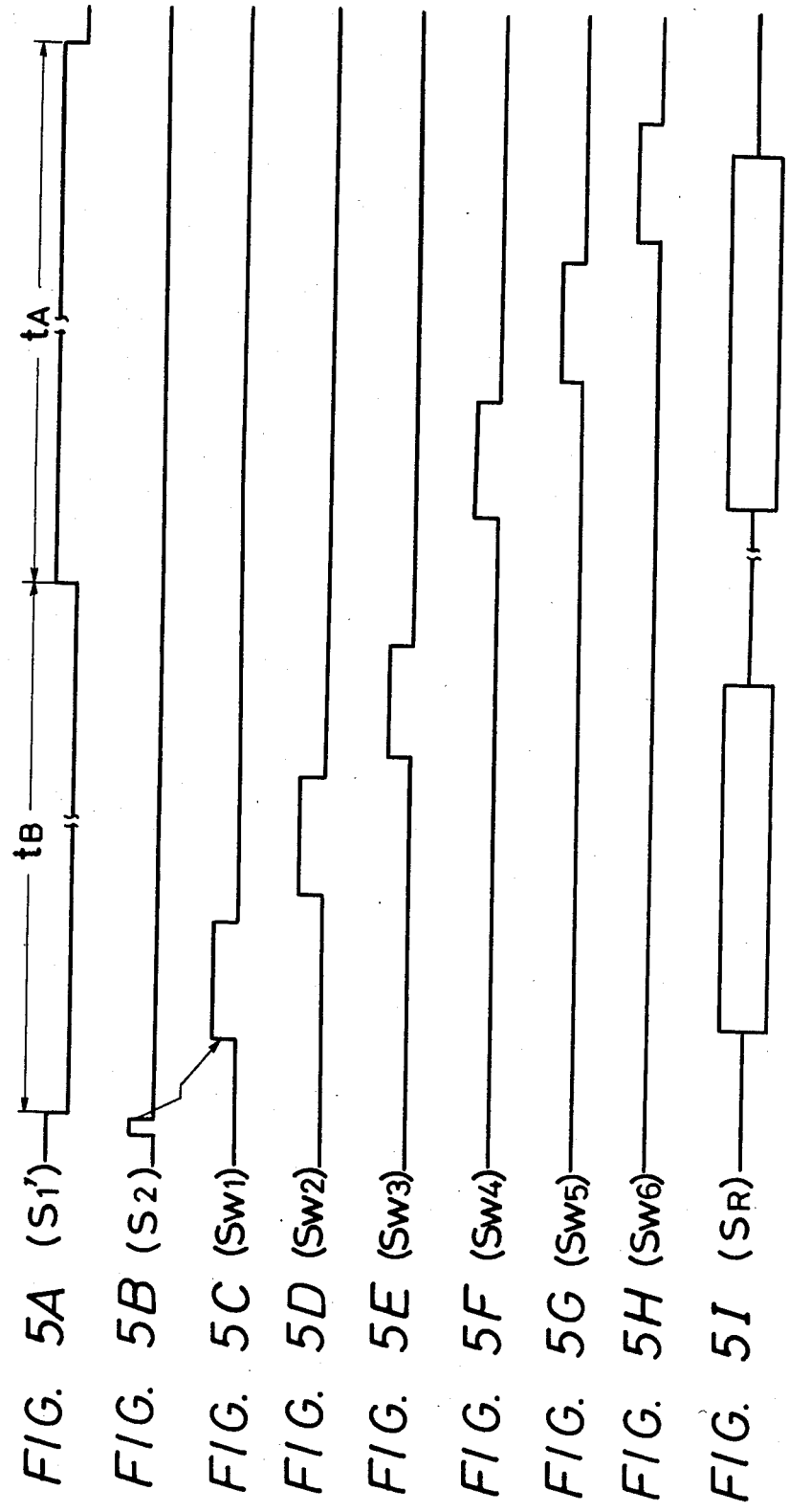

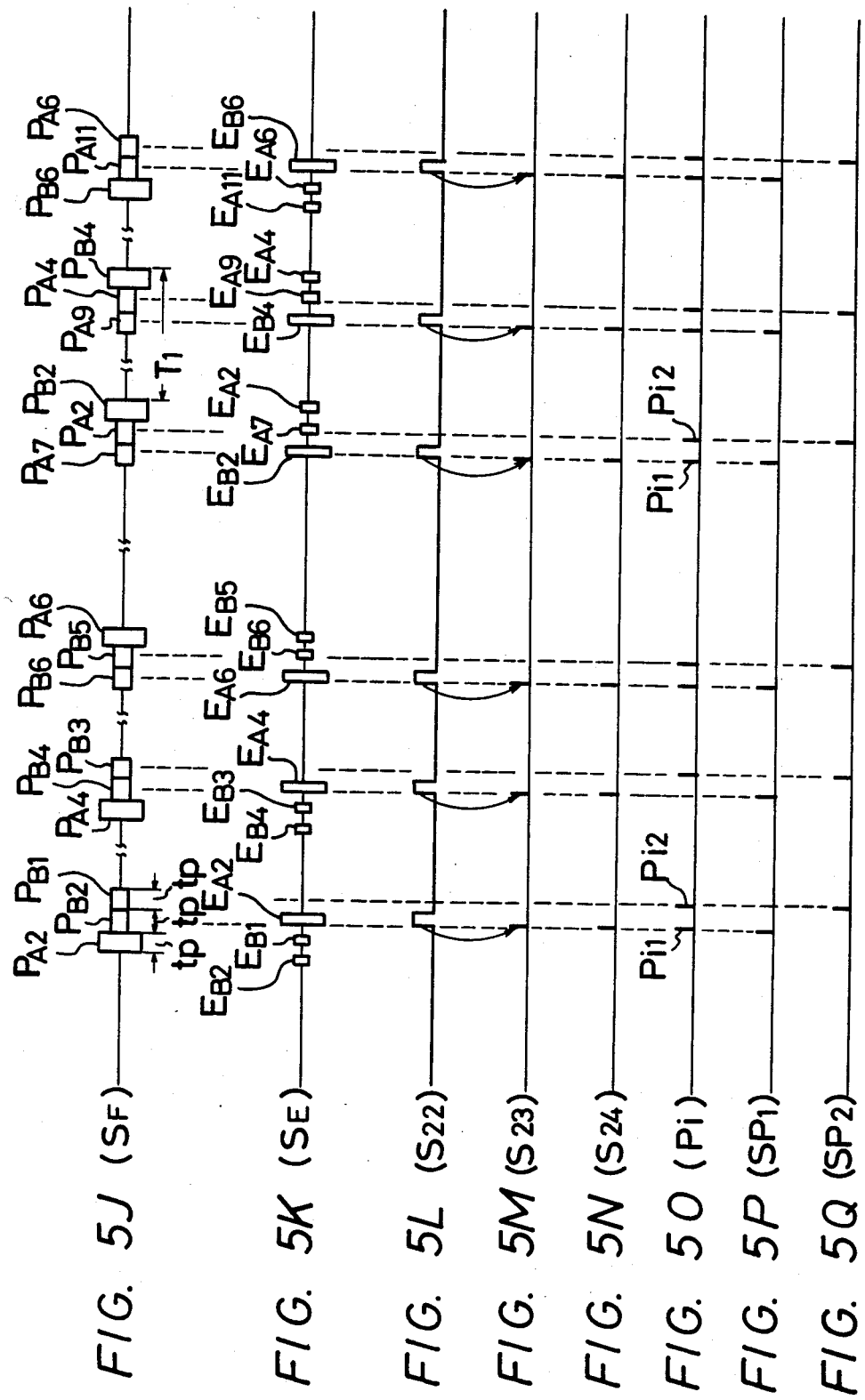

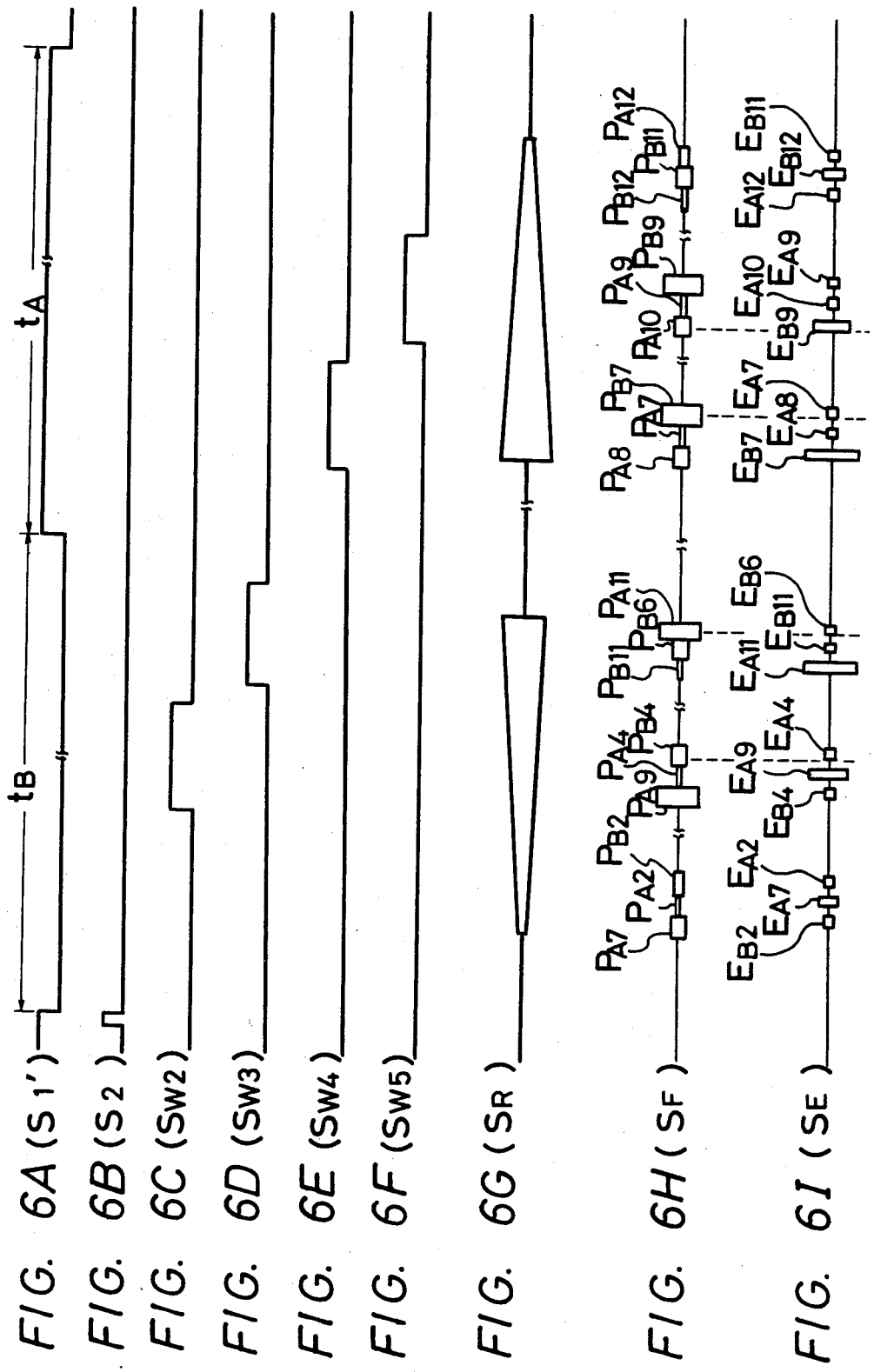

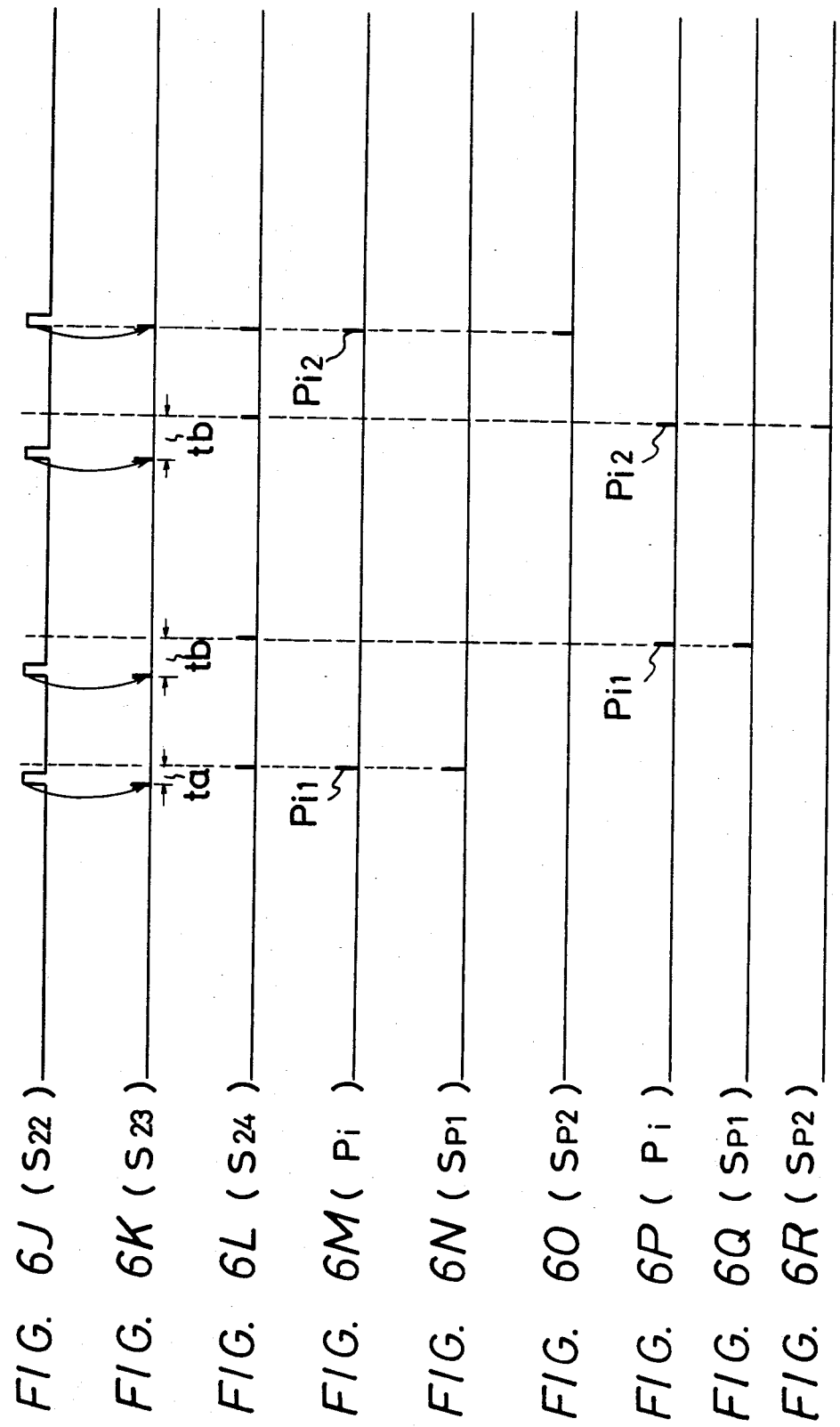

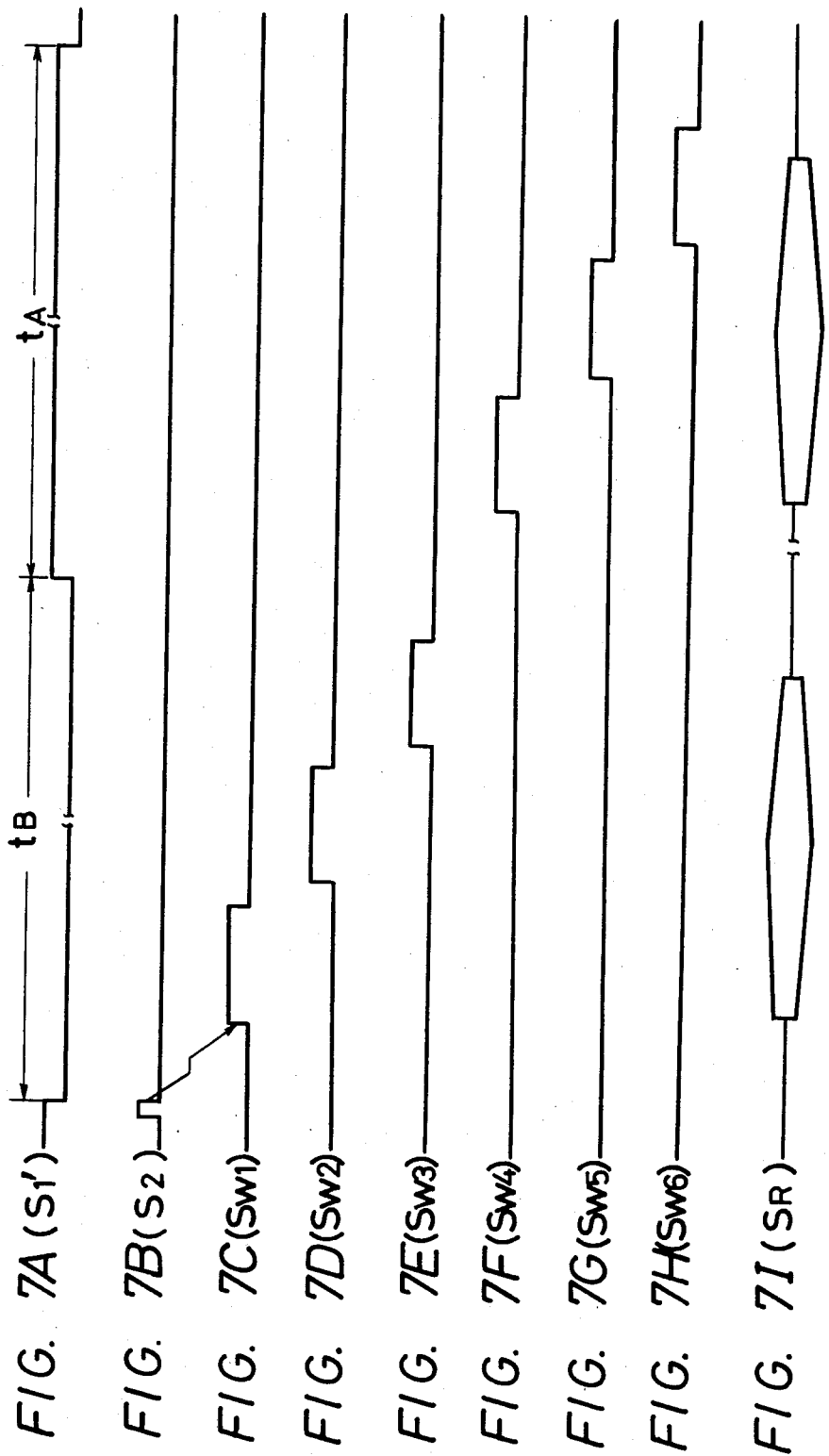

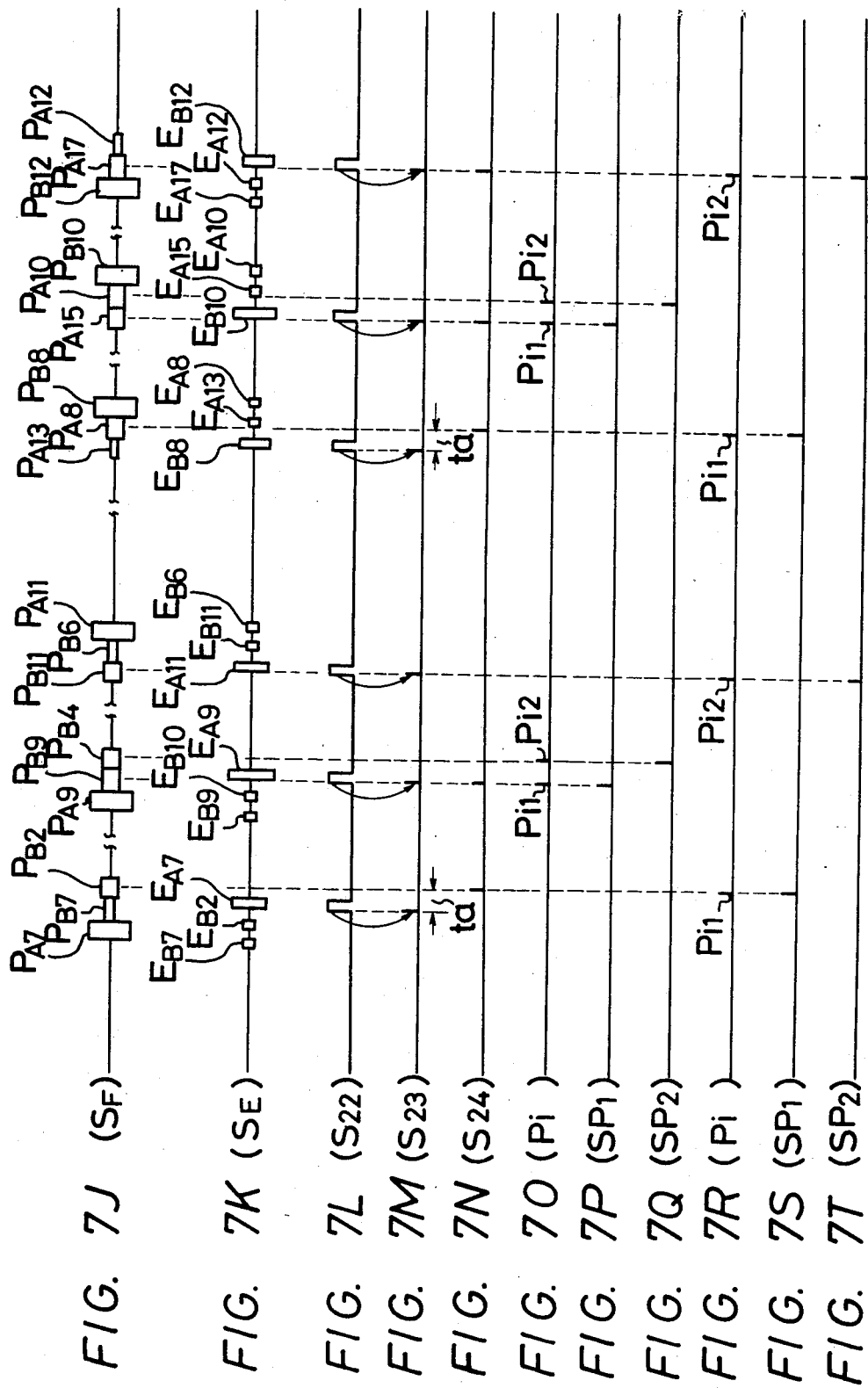

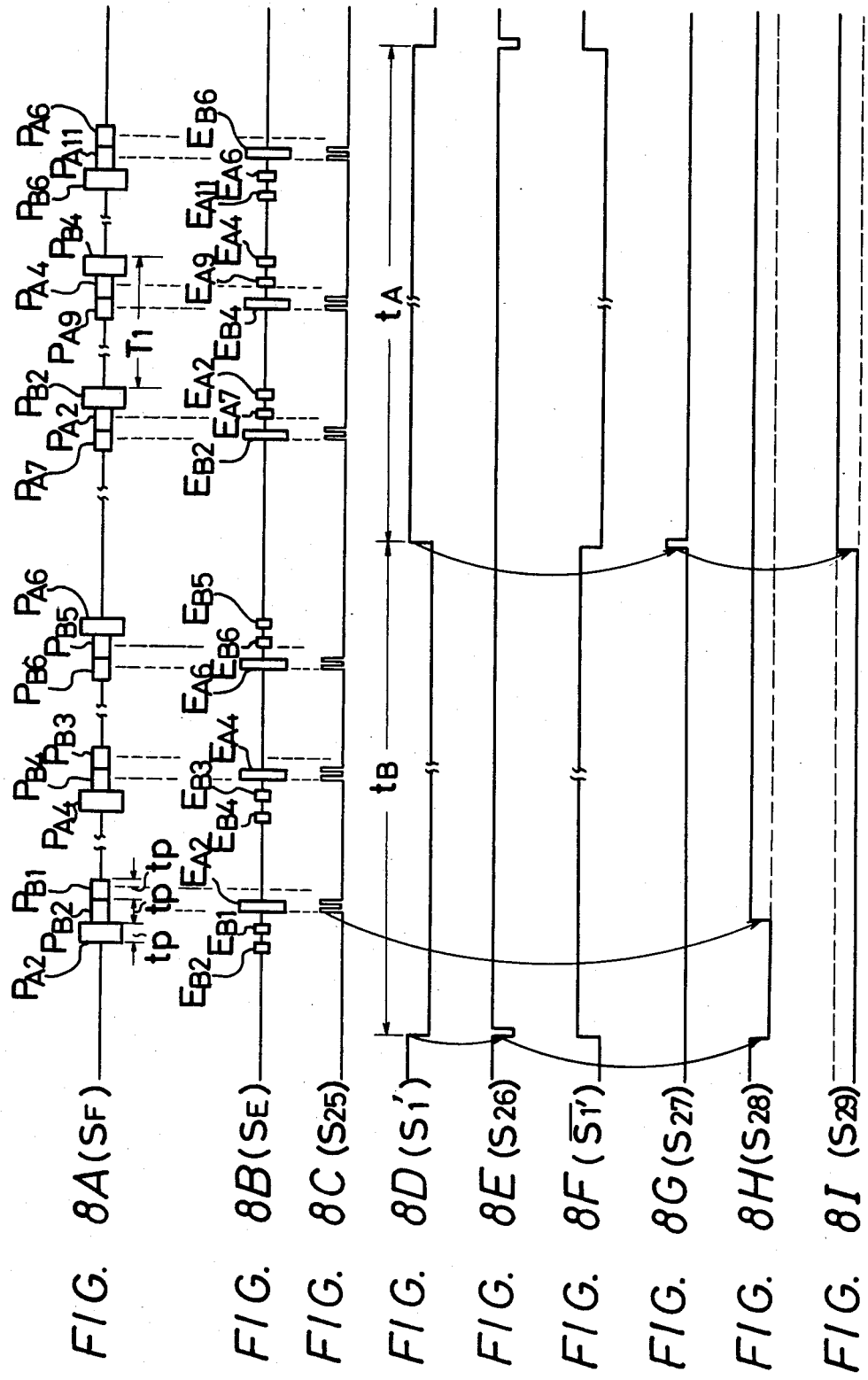

METHOD AND APPARATUS WITH IMPROVED TRACKING CONTROL FOR RECORDING A DIGITAL SIGNAL

BACKGROUND OF THE INVENTION

1. Field of the Invention

This invention relates generally to a method and apparatus for recording a digital information signal and, more particularly, relates to a method and apparatus for recording a digital information signal and a pilot signal using a rotary head and employing the pilot signal to control tracking alignment of the rotary head during playback.

2. Description of the Prior Art

When a video signal and an audio signal are recorded on a magnetic tape using a helical-scan rotary head to form slanted tracks, it is known that the video signal and audio signal can be advantageously reproduced if they are recorded in pulse-code modulated (PCM) form.

In this case, tracking control for controlling the rotary head to accurately trace the recorded tracks upon playback is typically carried out by using a control signal that has been recorded along one edge of the magnetic tape by a fixed head. This control signal is reproduced by a fixed head during the reproduction mode and the reproduced control signal and the rotary phase of the rotary head are maintained in constant phase relation.

This known tracking control method requires the use of a special fixed magnetic head and such fixed magnetic head is a disadvantage in compact equipment, because it requires its own mounting space in the recording and reproducing apparatus.

One approach to overcoming the use of the fixed head is a proposed tracking control method that does not use such fixed magnetic head but uses only the reproduced output signal from the rotary magnetic head to carry out the tracking control for the rotary head. This tracking control method is disclosed in, for example, U.S. patent application Ser. No. 06/584313 filed Feb. 28, 1984 and assigned to the assignee hereof. This tracking control method relies upon the fact that it is easy to time-compress and time-expand the PCM signal and also that it is not necessary to record and reproduce the PCM signal continuously, unlike an analog signal. Hence, the PCM signal and another different signal can easily be recorded on separate regions of each of the plurality of slanted tracks formed during recording.

When the PCM signal is time-compressed and magnetically recorded by a plurality of rotary heads to form the slanted tracks with no guard bands between adjacent tracks, a plurality of tracking control pilot signals are recorded in the longitudinal direction in each track to form a record region independent from the record region for the PCM signal. Upon playback the recorded track is traced by the rotary head having a tracing width greater than the track width, and the tracking of the rotary head is controlled by the pilot signals reproduced from the tracks adjacent the track being traced by the rotary head.

As a reference signal for the tracking control pilot signal a pulse signal (PG) having a frequency of 30 Hz is used that is indicative of the rotary phase of the head and that is generated in synchronism with the rotation of the motor that drives the rotary head.

Nevertheless, during playback when the pulse signal PG is used as a position detecting reference when the tracking pilot signal is reproduced, the reference position of the pulse signal PG can be altered or displaced due to mechanical and electrical variations in the parameters of the apparatus, caused by changes in temperature and the environment, and such variations appear as a kind of tracking error constant (offset) upon playback.

As a result, upon playback, it becomes difficult to reproduce the tracking pilot signal with the same timing as that which was present during recording, and control of the rotary head becomes imprecise. This provokes a particular disadvantage because it becomes impossible to achieve compatibility among individual units of the same kind of apparatus.

Furthermore, because the sampling pulse that is used to reproduce the tracking pilot signal over one rotational period of the rotary head is formed with the pulse signal PG as a reference, the amount of error present therein becomes integrated, so as to be increased by so-called jitter and the position of the sampling pulse is displaced in time.

Moreover, in any tracking control system for use with such recording and reproducing apparatus, not only the normal playback mode must be considered but also variable tape-speed playback modes, in which the tape speed is different from that of the recording mode, must be taken into consideration.

OBJECTS AND SUMMARY OF THE INVENTION

Accordingly, it is an object of the present invention to provide an improved method and apparatus for recording a digital information signal that can eliminate the above-noted defects inherent in the prior act.

It is another object of the present invention to provide an improved method and apparatus for recording a digital information signal by employing a tracking control system using a pilot signal recorded at predetermined locations on the tracks.

According to one aspect of the present invention, a method of recording digital signals on a record medium, such as a magnetic tape, using a rotary head that periodically traces the record medium comprises the steps of recording a digital information signal at first predetermined areas in a plurality of slanted tracks on the record medium by the rotary head formed with no guard bands between adjacent tracks; determining at least second and third predetermined areas near both ends of the slanted tracks that are at different locations than the first predetermined areas; recording a tracking pilot signal on every other one of the plurality of slanted tracks in the second and third predetermined areas at selected positions separated from ends of the slanted tracks; and recording the tracking pilot signal on alternate ones of the plurality of slanted tracks in the second and third predetermined areas at second selected positions different from the first selected positions.

The above and other objects, features, and advantages of the present invention will become apparent from the following detailed description of illustrative embodiments thereof to be read in conjunction with the accompanying drawings, throughout which like references designate the same elements and parts.

BRIEF DESCRIPTION OF THE DRAWINGS

FIGS. 1A and 1B together comprise a complete schematic in block diagram form showing an embodiment of the present invention;

FIG. 2 is a representation of a rotary head assembly for use with the circuit of FIG. 1;

FIG. 3 is a representation of a track pattern recorded on a record medium according to the present invention;

FIGS. 4A to 4V are signal waveform diagrams useful in explaining the recording operation of the embodiment of FIG. 1;

FIGS. 5A to 5Q are signal waveform diagrams useful in explaining a normal playback operation of the embodiment of FIG. 1;

FIGS. 6A to 6R are signal waveform diagrams useful in explaining the playback operation at a tape speed two times higher than a normal tape speed of the embodiment of FIG. 1;

FIGS. 7A to 7T are signal waveform diagrams useful in explaining the playback operation at a tape speed three times higher than a normal tape speed of the embodiment of FIG. 1; and FIGS. 8A to 8I are signal waveform diagrams useful in explaining the playback operation of the embodiment of FIG. 1.

DESCRIPTION OF THE PREFERRED EMBODIMENT

Figure 1A:
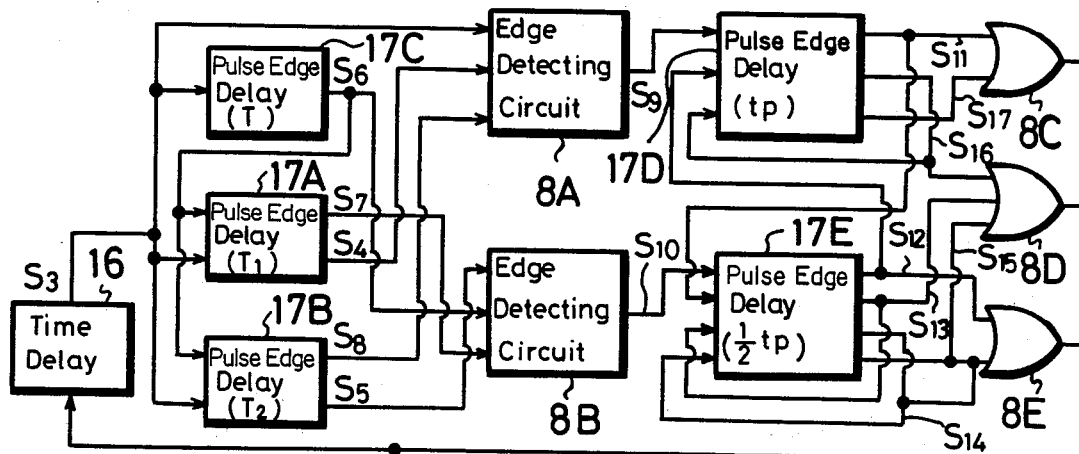

FIGS. 1A and 1B schematically represent a circuit arrangement of an embodiment of the present invention in which only the circuit elements that are directly concerned with the present invention are shown. In this embodiment of the present invention, a tracking pilot signal and an erase signal are recorded and are reproduced in the normal playback mode, as well as in a variable tape speed playback mode, such as when the tape speed is two or three times the normal tape speed. Thus, the circuit arrangement for recording and reproducing the information singal, such as a PCM signal, for example, is omitted, because they form no part of the present invention.

Rotary heads 1A and 1B are arranged in contact with a magnetic tape 2, which is used as the recording medium, and rotary heads 1A and 1B are mounted on the periphery of a tape guide drum 3 and separated by an equal angular distance, namely, 180°, as shown in FIG. 2. In this embodiment, magnetic tape 2 is wrapped around the outside of tape guide drum 3 at its peripheral portion with an angular spacing less than 180°, for example, an angular spacing of 90°. Rotary heads 1A and 1B are rotated at 30 revolutions per second in a direction shown by arrow 4H, and tape 2 is driven in a direction shown by arrow 4T at a predetermined speed, so that slanted magnetic tracks 5A and 5B are respectively recorded on magnetic tape 2 by rotary heads 1A and 1B in a so-called overlapped writing state, as shown in FIG. 3. This overlapped writing state is provided when the tracing width (W) of the head gap is chosen to be greater than the track width. It is understood that in this case, the angular directions of the gaps of the rotary heads 1A and 1B are made different from each other relative to the direction perpendicular to their tracing direction. In other words, the so-called azimuth angles of the rotary heads 1A and 1B are chosen to be different from each other to take advantage of the azimuth effect to cancel cross-talk.

It then follows that there occurs a period in which neither of the two rotary heads 1A and 1B are in contact with the magnetic tape 2, and this period corresponds to the angular range of 90°. If this non-contact period is used to perform the addition of redundant data during recording and to perform error correction and the like during playback, it is possible to simplify the system.

Referring back to FIGS. 1A and 1B, a pilot signal oscillator or generator 6 produces a tracking pilot signal P, with a frequency $f_0$ selected to be a value that will produce a relatively large azimuth loss, for example, 200 KHz, so that the tracking pilot signal P can be recorded at a relatively high level. If a linear relationship between tracking phase displacement and reproduced pilot signal output is desired, then frequency $f_0$ of the tracking pilot signal P is selected to be a frequency having a relatively small amount of azimuth loss.

An erase signal generator 6A, produces an erase signal E to erase the previously recorded pilot signal, because when new information is recorded on a magnetic tape on which the information was previously recorded, everything must be erased since each record track is not always identical in location with respect to the previous corresponding record track. The frequency of the erase signal E is selected to be, for example, around 700 KHz, which is sufficiently distant from the frequency $f_0$ of the pilot signal and has a relatively large azimuth loss. The recording level thereof is selected to be sufficiently high to erase the pilot signal P. As will be described more fully hereinbelow, the erase signal E is also used as a position detecting signal that detects the position of the pilot signal.

An erase signal generator 6B is also provided that produces another erase signal $E_0$, which is different from the above-noted erase signal E. Preferably, the erase signal $E_0$ has a high erasing ratio relative to both the pilot signal P and to the erase signal E when they are recorded in the overlapped state. The frequency $f_2$ of erase signal E is selected to be for example, around 2 MHz.

Recording waveform generators 7, 7A, and 7B respond to outputs from edge detecting circuits 8A and 8B that detect an edge portion, for example, a trailing edge, of a delay signal associated with a pulse PG, which will be described in detail in the following. Recording waveform generators 7 and 7A, respectively, receive the pilot signal and the erase signal $E_0$ from the generators 6 and 6B and produce the pilot signal P and erase signal $E_0$ which have a predetermined pulse width tp indicative of the number of the pilot signal P and the erase signal $E_0$ recorded per track and the manner in which they are arranged in the track. In this case, tp represents the recording time of each of pilot signal P and erase signal $E_0$. The recording time of the erase signal $E_0$ per recording area represents a continuous time tp in track 5A, while in track 5B such time tp represents the sum of the time intervals of two distant places. Recording waveform generator 7B receives the erase signal E from erase signal generator 6A and produces at every predetermined time interval T1 the erase signal E having a predetermined time ½ tp, which thereby indicates the number and arrangement of the erase signal E being recorded per track. An OR circuit 8F processes logically the outputs from recording waveform generators 7, 7A, and 7B. A switching circuit 9 changes over the signal fed in from the rotary heads 1A and 1B in response to a switching signal S1, the waveform of which is shown in FIG. 4A, which generated from a timing signal generator 10. Timing signal generator 10 is supplied with a pulsed signal PG having a frequency of 30 Hz, which is indicative of the rotary phase of rotary heads 1A and 1B, that is produced from a pulse generator 11 in synchronism with the revolution of a drive motor 12, which rotates rotary heads 1A and 1B. The 30 Hz frequency pulsed signal from timing signal generator 10, derived from the pulsed signal PG, also is supplied to a phase servo circuit 13, and the rotary phase of motor 12 controlled by a servo signal output therefrom.

The pilot signal output from switching circuit 9, which is changed over in response to the switching signal S1 from timing signal generator 10, is amplified either by amplifiers 14A or 14B and supplied to contact R of respective switching circuits 15A or 15B and fed through the movable contact arm to rotary head 1A or 1B, respectively, and thereby recorded on magnetic tape 2. The movable contact arms of switching circuits 15A and 15B are connected to contacts R during recording and are connected to contacts P during reproduction.

An output signal S2, the waveform of which is shown in FIG. 4C, from timing signal generator 10 is supplied to a delay circuit 16, in which it is delayed by a time corresponding to the distance of the mounting positions between rotary heads 1A, 1B and pulse generator 11 and response delays introduced by other system elements. The output signal from time delay unit 16 is a delayed signal S3 supplied to the input side of edge detecting circuit 8A, which detects a selected one or the other of the edge portions. In this embodiment, the trailing edge of this signal is used as a reference for recording the pilot signal P. The trailing edge of the signal S3, the waveform of which is shown in FIG. 4D, delayed by delay circuit 16 is made coincident with the time at which the first rotary head will come into contact with magnetic tape 2 during one revolution period.

Pulse edge delay circuits 17A, 17B, and 17C provide respective delay times T1, corresponding to each time duration of the pilot signal P and erase signals E and E₀ that are recoded on one track, T2, corresponding to two T1, and T, corresponding to a one-half rotation period of a rotary head. Pulse edge delay circuits 17D has a time delay of tp and pulse edge circuits 17E has a time delay of ½ tp. A signal S4, the waveform of which is shown in FIG. 4E, produced by pulse edge delay circuit 17A is supplied to edge detecting circuit 8A, a signal S5, the waveform of which is shown in FIG. 4F, produced by pulse edge delay circuit 17B is supplied to edge detecting circuit 8B, and a signal S6, the waveform of which is shown in FIG. 4G, is produced by pulse edge delay circuit 17C is also supplied to edge detecting circuit 8B. Signals S7 and S8, the waveforms of which are shown in FIGS. 4H and 4I, respectively, which were delayed by times T1 and T2 in pulse edge delay circuits 17A and 17B, respectively, are fed to edge detecting circuits 8B and 8A.

Signals S9 and S10, whose waveforms are shown in FIGS. 4J and 4K, respectively, from respective edge detecting circuits 8A and 8B are supplied to pulse edge delay circuits 17D and 17E, wherein they are delayed by times tp and ½ tp to form signals S11 and S12, respectively. The waveforms of signals S11 and S12 are shown in FIGS. 4L and 4M, respectively. The signal S11 is fed to one input terminal of an OR gate 8C and also fed to pulse edge delay circuit 17E, in which it is delayed by a time ½ tp to form signal S13, whose waveform is shown in FIG. 4N. Signal S13 is fed to one input terminal of a second OR gate 8D and also fed to pulse edge delay circuit 17E, in which it is delayed by time ½ tp to form signal S14, whose waveform is shown in FIG. 4O. Signal S14 is supplied to pulse edge delay circuit 17E, in which it is delayed by a time ½ tp to form signal S15 fed to another input terminal of second OR gate 8D. The waveform of signal S15 is shown in FIG. 4P.

Signal S12 is fed to another input terminal of third OR gate 8E and is also fed to pulse edge delay circuit 17D, in which it is delayed by time tp to form signal S16 that is supplied to another input terminal of second OR gate 8D and also supplied to pulse edge delay circuit 17D, in which it is delayed by a time tp to form signal S17 that is fed to another input terminal of OR gate 8C. The waveforms of signals S16 and S17 are shown in FIGS. 4Q and 4R, respectively.

Output signals S18, S19, and S20 from OR gates 8C, 8D and 8E, respectively, are fed to recording waveform generating circuits 7, 7A, and 7B to operate as the respective gating signals thereof, so that the pilot signal P and the erase signals E₀ and E for the generators 6, 6B, and 6A are respectively supplied through the recording waveform generating circuits 7, 7A, and 7B and then developed at the output side of the three-input OR gate 8F as a composite signal S21, whose waveform is shown in FIG. 4V. The waveforms of signals S18, S19, and S20 are shown in FIGS. 4S, 4T, 4U, respectively.

In regard to the playback mode, amplifiers 18A and 18B are supplied with the reproduced output signals from the corresponding rotary heads 1A and 1B when the movable contact arms of switching circuits 15A and 15B are connected to the respective contacts during playback. The outputs from both amplifiers 18A and 18B are supplied to respective fixed contacts of a switch 19. On the basis of a 30 Hz switching signal S1′ produced by timing signal generator 10, switch 19 is alternately changed in position to connect one fixed contact during a one-half period of rotation including the tape contact period of rotary head 1A and to connect the other fixed contact during one-half rotation period that includes the tape contact period of rotary head 1B, similar to the recording mode.

A narrow bandwidth bandpass filter 20 having a center pass frequency f₀ that passes therethrough only the pilot signal P of the reproduced output signal fed through switch 19. A peak-hold circuit 21 holds the peak value of the output from bandpass filter 20 in order to enhance the response characteristics thereof and a sample-and-hold circuit 22 samples and holds the peak value thus held in peak-hold circuit 21. A comparing circuit 23 that may, for example, comprise a differential amplifier compares the outputs from peak-hold circuit 21 and sample-and-hold circuit 22 and produces an output signal indicative of such comparison fed to another sample-and-hold circuit 24 that samples and holds the compared error signal produced by differential amplifier 23. Sample-and-hold circuits 22 and 24 sample and hold a crosstalk component of each of the two pilot signals P derived, in a first case, from both the end portions and the center portions of tracks adjacent the track being traced during the normal playback mode, in a second case, from the center portion or end portion of the track being traced during playback at a tape speed twice that of the normal playback mode, and in a third case, from the center portions or both end portions of the tracks adjacent the track being traced during a playback mode at a tape speed three times that of the normal tape speed, as will be described hereinbelow. The output of sample-and-hold circuit 24 is then the tracking control signal and is supplied through a switch 25 to an output terminal 26.

In order to form the necessary sampling pulses for sample-and-hold circuits 22 and 24, a narrow band bandpass filter 29 with a center pass frequency $f_1$ is connected to receive the output from switching circuit 19 to derive therefrom only the erase output E. The output signal SE from bandpass filter 29 is supplied to a waveform shaping circuit 30, in which its wave is reshaped to produce output signal S22. The waveform of signal SE is shown in FIGS. 5K, 6I, and 7K, and the waveform of output signal S22 is shown in FIGS. 5L, 6J, and 7L.

A leading edge detector 31 detects the leading edge of the output signal from waveform shaping circuit 30 and at every one-half rotation period of the rotary head assembly, the leading edge of the erase signal is detected by leading edge detecting circuit 31. The output signal from leading edge detecting circuit 31 is fed to a plurality of identical gate circuits $33_1$, $33_2$, $33_3$, $33_4$, $33_5$, and $33_6$. Window signals $S_{W1}$ to $S_{W6}$ generated by a window signal generating circuit 34 that may employ, for example, a counter, are used as the gating signals for gate circuits $33_1$ and $33_6$, respectively. Window signal generating circuit 34 responds to the output signal S2 of the timing signal generating circuit 10 to count the pulses in clock signal CLK supplied at a clock terminal 42, so that the window signal generating circuit 34 produces a window signal of a predetermined width that can cover at least both end edges of the waveform shaping circuit 30 output signal S22, in response to different playback modes. The waveforms of window setting signals $SW_1$, $SW_2$, $SW_3$, $SW_4$, $SW_5$, and $SW_6$ are shown in FIGS. 5C, 5D, 5E, 5F, 5G, and 5H, respectively.

More specifically, when window signal generating circuit 34 receives a command signal to set the normal playback mode from mode setting circuit 32, it produces all of the window signals $S_{W1}$ to $S_{W6}$ in sequence; when window signal generating circuit 34 receives a command signal to set the playback mode at a tape speed twice that of normal, it produces only window signals $S_{W2}$ and $S_{W5}$ or $S_{W3}$ and $S_{W4}$; and when window signal generating circuit 34 receives a command signal to set the playback mode at a tape speed three times that of normal, it produces only window signals $S_{W2}$, $S_{W5}$, and $S_{W1}$, or $S_{W3}$, $S_{W1}$, and $S_{W6}$.

Accordingly, only the edge portion of the signal S22 that enters the periods of the window signals $S_{W1}$ to $S_{W6}$ is produced at the output of gate circuits 33, to $33_6$ and these edge portion s are fed to OR gate 35 that produces an output signal S23, the waveform of which is shown in FIGS. 5M, 6K, and 7M, which is fed to one input terminal of a time delay circuit 36. Time delay circuit 36 may include a counter, for example, that is connected to use signal S23 as a start pulse.

A delay time setting circuit 38 sets a delay time ta from the time of occurrence of the pulses in signal S23 during the playback modes in which the tape speed is twice and three times that of normal tape speed for sampling the pilot signal. Similarly, a delay time setting circuit 39 sets a delay time tb following an occurrence of the pulses in signal S23 during the playback mode in which the tape speed is twice that of normal tape speed for sampling the pilot signal. The respective delay times ta and tb set by the delay time setting circuits 38 and 39 are supplied to delay time setting selector 37 and are individually selected by the window signals $S_{W1}$ to $S_{W6}$ fed thereto from window signal generating circuit 34. The thus selected delay time is supplied to delay circuit 36 at another input terminal. Delay circuit 36, that may comprise a counter, uses the signal S23 as a start signal to deliver the clock signal CLK supplied at clock terminal 42 if the delay is not necessary, or to count the clock signal CLK only during the period of time thus set, if a delay is necessary. At the end of the count operation, delay circuit 36 produces an output signal S24 having a narrow pulse width. The waveform of signal S24 is shown in FIGS. 5N, 6L, and 7N.

A pulse generator 43 that may employ, for example, a counter, counts the pulses of clock signal CLK also supplied thereto from clock terminal 42 by using signal S24 from delay circuit 36 as a trigger pulse. Pulse generator 43 then produces a pair of pulses Pi at a predetermined interval during the normal playback mode and during the playback mode in which the tape speed is three times that of normal, in a first case. In a second case, one of the pair of pulses Pi corresponds to each pilot signal to be detected during the playback mode in which the tape speed is twice that of normal and in the playback mode in which the tape speed is three times that of normal. The pulse Pi is supplied to peak hold circuit 21 and also to a sampling pulse generator circuit 44 that may employ, for example, a D flip-flop circuit or the like. Sampling pulse generator circuit 44 produces sampling pulse signals $S_{P1}$ and $S_{P2}$ fed to sample-and-hold circuits 22 and 24, respectively, in response to the pulse Pi.

A comparing circuit 51 has one input connected to the output signal 5E from bandpass filter 29 and compares this signal, which is in effect a reproduction of the erase signal E, with a reference level from a reference voltage source 52. If the reproduced output signals exceeds the reference level, comparing circuit 51 produces an output signal S25 that is fed to the clock terminal of a D flip-flop circuit 53 as the latch pulse thereof. An edge detecting circuit 54 detects the trailing edge of the switching signal S1' derived from the timing signal generator 10. So that, in synchronism with the trailing edge of the switching signal S1', the trailing edge detector 54 produces and supplies an output signal S26 to the reset terminal R of flip-flop circuit 53. The waveform of signal S26 is shown in FIG. 8E. Additionally, switching signal S1' is inverted by an inverter 55 to become signal $\overline{S1'}$ that is fed to the D input terminal of flip-flop 53. The waveform of signal $\overline{S1'}$ is shown in FIG. 8F.

Another detecting circuit 56 detects the leading edge of the switching signal S1', so that in synchronism with the leading edge of the switching signal S1' detecting circuit 56 produces an output signal S27 that is fed to a clock terminal of another D flip-flop circuit 57. Supplied to the D input terminal of flip-flop circuit 57 is the output signal S28 from flip-flop circuit 53 and the output signal S29 from flip-flop circuit 57 is fed to switch 25 to act as the switching control signal thereof. As will be described hereinbelow, when the control signal S29 is at one level, for example, a high level (H), the movable contact of switch 25 is connected to contact a so as to deliver the tracking control signal to the output terminal 26, thereby to carry out normal operation, whereas when the control signal S29 is at other level, for example, a low level (L), the movable contact of the switch 25 is connected to contact b to deliver at output terminal 26 a constant potential or voltage Vcc supplied at terminal 58. This constant voltage Vcc is then supplied through output terminal 26 to a capstan servo system (not shown) as the tracking control signal, whereby the rotary head during the tracing operation is forced into the normal tracking state.

The above-described operation of the inventive circuit of FIG. 1 can be more fully described with reference to the signal waveforms illustrated in FIGS. 4 to 8. During recording, in response to the pulse PG produced by pulse generator 11 in order to represent the rotary phase of rotary heads 1A and 1B, timing signal generator 10 produces signal S2 shown in FIG. 4C. Signal S2 is fed to delay circuit 16 and delayed by the predetermined time TR and delay circuit 16 then produces as its output the signal S3, shown in FIG. 4D. As described above, the signal S3 is fed directly as well as through delay circuits 17A and 17B to edge detecting circuit 8A, in which the trailing edge thereof is detected. In synchronism with the trailing edge of signal S3 edge detecting circuit 8A produces a narrow pulse width output signal S9, shown in FIG. 4J. The signals S5, S6, and S7 from delay circuits 17B, 17C, and 17A, respectively, are supplied to edge detecting circuit 8B, in which the trailing edges thereof are detected. Thus, in sychronism with the trailing edges of signals S5, S6, and S7, edge detecting circuit 8B produces output signal S10, the waveform of which is shown in FIG. 4K. The signals S9 and S10 are supplied to time delay circuits 17D and 17E, respectively, in which they are delayed along with the other signal inputs thereto, as described hereinabove. The waveforms of the delayed output signals produced by delay units 17D and 17E are shown in FIGS. 4L to 4R. These output signals are fed to OR circuits 8C, 8D, and 8E to produce output signals S18, S19, and S20, respectively, the waveforms of which are shown in FIGS. 4S to 4U. Signals S18, S19 and S20 form the basis for recording start references for the pilot signal P and the erase signals $E_0$ and $E$, respectively, for rotary heads 1A and 1B are determined.

Signals S18, S19, and S20 are respectively supplied to recording waveform generating circuits 7, 7A, and 7B, so that recording waveform generating circuit 7 allows the pilot signal P, which is produced by pilot signal generator 6, to pass therethrough with a predetermined time interval, shown in FIG. 4S, only during the predetermined time tp in synchronism with the signal S18. Similarly, recording waveform generating circuit 7A allows the erase signal $E_0$, which is produced by erase signal generator 6B, to pass therethrough with a predetermined time interval, shown in FIG. 4T only during the predetermined time interval tp in synchronism with the signal S19 supplied thereto, and recording waveform generating circuit 7B allows the erase signal E, which is produced by erase signal generator 6A, to pass therethrough with a predetermined time interval, shown in FIG. 4U only during the predetermined time ½ tp in sychronism with the signal S20. The output signals from recording waveform generating circuits 7, 7A, and 7B are added together by OR circuit 8F to produce signal S21, the waveform of which is shown in FIG. 4V.

As an operative example, assume that track 5B2, as shown in FIG. 3, is to be recorded by rotary head 1B, then, the first, second, and third pulses of signal S18 (FIG. 4S) correspond respectively to pilot signals $P_{A2}$, $P_{A4}$, and $P_{A6}$; the first, second, and third pulses of the signal S19 (FIG. 4T) correspond respectively to erase signals $E_0$ adjacent both sides of the erase signals $E_{A2}$ and $E_{A4}$ and one side of the erase signal $E_{A6}$; and the first, second, and third pulses of the signal S20 (FIG. 4U) correspond respectively to erase signals $E_{A2}$, $E_{A4}$, and $E_{A6}$ adjacent the above-noted erase signal $E_0$. Thus, the composite signals formed of $P_{A2}$, $E_0$, $E_{A2}$, $E_0$; and $E_{A4}$, $E_0$, $E_{A4}$, $E_0$; and $E_{A6}$, $E_0$, $P_{A6}$ are each produced at the output of OR gate 8F.

Further in this example, assume that track 5A2 in FIG. 3 is to be recorded by rotary head 1A, then the first, second, and third pulses of signal S18 (FIG. 4S) respectively correspond to pilot signals $P_{B2}$, $P_{B4}$, and $P_{B6}$; the first, second, and third pulses of signal S19 (FIG. 4T) respectively correspond to the erase signals $E_0$ that are adjacent one side of the erase signals $E_{B2}$ and $E_{B4}$ and to both sides of the erasing signal $E_{B6}$; and the first, second and third pulses of signal S20 (FIG. 4U) respectively correspond to the erase signals $E_{B2}$, $E_{B4}$, and $P_{B6}$ that are adjacent the above-noted erase signals $E_0$. Thus, composite signals formed of $E_{B2}$, $E_0$, $P_{B2}$; $E_{B4}$, $E_0$, $P_{B4}$; and $P_{B6}$, $E_0$, $E_{B6}$, $E_0$ are each produced in this case at the output OR gate 8F.

At the same time, timing signal generator 10 produces switching signal S1 (FIG. 4A) in response to the pulse PG produced by pulse generator 11, which is synchronized with the rotation of rotary heads 1A and 1B so that, as shown in FIGS. 4A and 4B, within the half rotation period tA in which signal S1 is high, rotary head 1A contacts magnetic tape 2, while within the half rotation period tB in which signal S1 is low, rotary head 1B contacts magnetic tape 2. Then, the movable contact of switch 9 is connected as shown in FIG. 1 during the period tA and connected in the state opposite to that shown during the period tB, in response to switching signal S1, thereby changing over the connection to rotary heads 1A and 1B.

Figure 1:
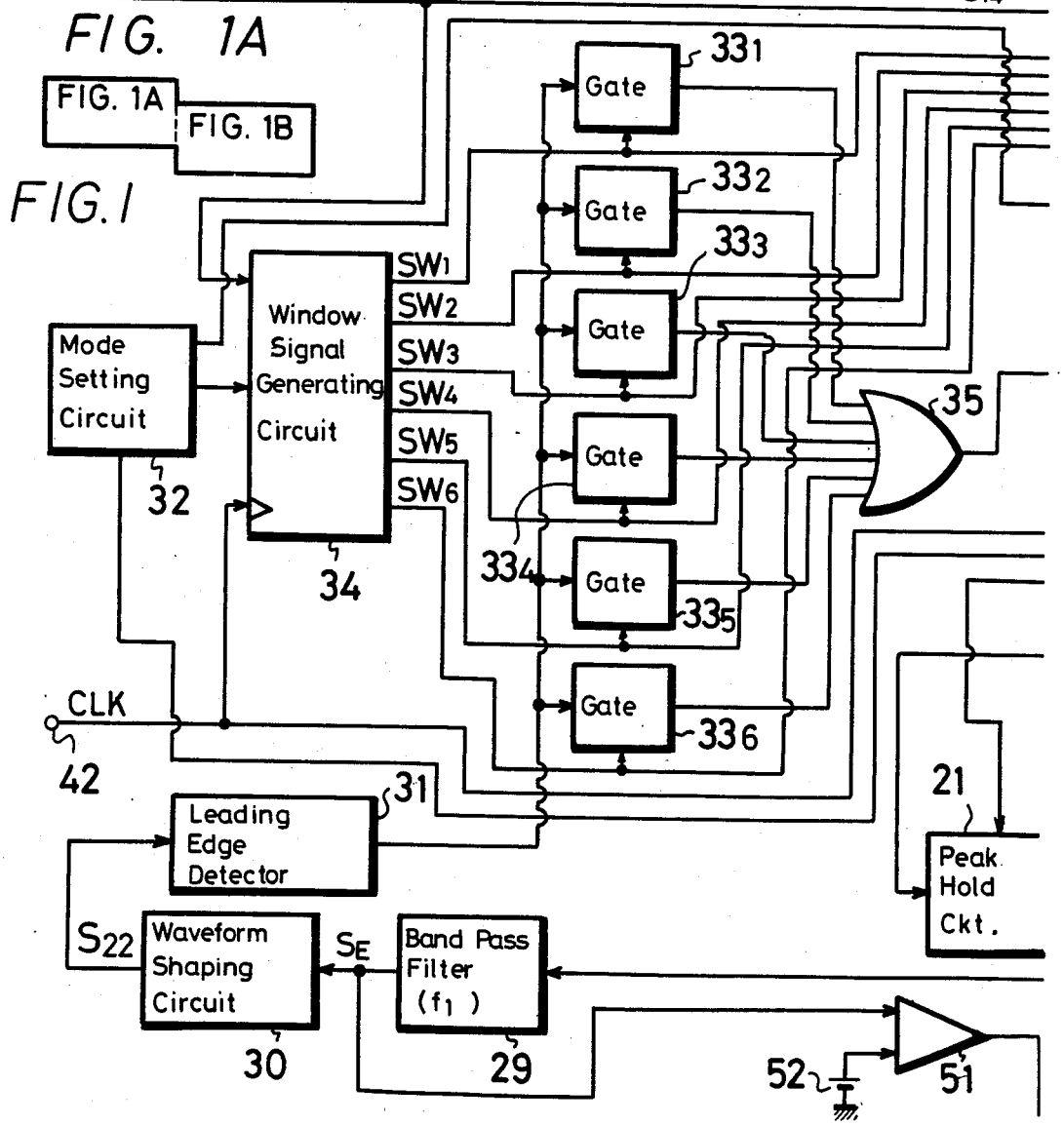
FIG. 1 is a diagram illustrating how FIGS. 1A and 1B should be combined.

When the movable contact of switch 9 is in the state opposite to that shown in FIG. 1, the signal S21 produced by OR gate 8F is supplied through amplifier 14B and contact R of switch 15B to rotary head 1B, so that at the beginning, center, and end of the period in which rotary head 1B contacts magnetic tape 2, during the period tB shown in FIG. 3, signal S21 is recorded at tracking signal recording regions $A_{T1}$ and $A_{T2}$, which are formed at both end portions in the longitudinal direction of track 5B and which are equidistant from the central position in the longitudinal direction of the track 5B by l (corresponding to T1) with times tp+½ tp+½ tp+½ tp and time ½ tp+tp+tp. This signal S21 is also recorded at a similar recording region $A_{T3}$ located at the central portion of track 5B, with times tp+½ tp+½ tp+½ tp.

When the movable contact of switching circuit 9 is connected as shown is FIG. 1, signal S21 is supplied through amplifier 14A and contact R of switch 15A to rotary head 1A, so that at the beginning, center, and end of the period in which rotary head 1A contacts magnetic tape 2 during the period tA, signal S21 is recorded at like tracking signal recording regions $A_{T1}$ and $A_{T2}$, which are formed at both end portions in the longitudinal direction of the track 5A equidistant from the central position in the longitudinal direction of the track 5A by l (corresponding to $T_0$ with times ½ tp+tp+tp and times tp+½ tp+½ tp. This signal S21 is recorded also on like recording region $A_{T3}$, which is formed at the central portion of track 5A with times ½ tp+tp+tp.

Although not shown in the drawings, in the period in which the pilot signal and the erase signals are not recorded, one segment of an audio PCM signal should be recorded as one track supplied through amplifier 14A to rotary head 1A during the period tA and supplied through amplifier 14B to rotary head 1B during the period tB and then recorded on recording regions $A_{P1}$ and $A_{P2}$ on the tracks 5A and 5B, respectively, except during the above-noted recording regions of the pilot signal.

During the normal playback mode, the signals reproduced from magnetic tape 2 by rotary heads 1A and 1B are supplied through contact P of switch 15A and amplifier 18A and contact P of switch 15B and amplifier 18B, respectively, to switch 19. Switch 19 is alternately changed over by the 30 Hz switching signal S1' (FIG. 5A) produced by timing signal generator 10, similar to the operation in the recording mode, during the half rotation period tA that includes the tape contact period of rotary head 1A and during the half rotation period tB that includes the tape contact period of head 1B. Accordingly, switch 19 provides an intermittent PCM signal segment SR, as shown in FIG. 5I. This signal SR is supplied to a playback processor (not shown) in which it is demodulated to the original PCM signal, which is supplied to a decoder (not shown), in which the data of each block is detected on the basis of a block synchronizing signal and in which error correction, de-interleave processing, and the like are carried out. The signal SR is then reconverted to an analog audio signal by a digital-to-analog converter (not shown) and fed out as the output signal.

As an operative example of tracking control, assume that rotary head 1B has a tracing width W that includes track 5B2, as represented by the two one-dot chain lines in FIG. 3. Then, rotary head 1B traces tracks 5A2 and 5A1 adjacent track 5B2, so that in the region $A_{T1}$ pilot signal $P_{A2}$ recorded on track 5B2, pilot signal $P_{B2}$ recorded on the adjacent track 5A2, and pilot signal $P_{B1}$ that is recorded on track 5A1 are reproduced. Similarly, in region $A_{T3}$, pilot signal $P_{A4}$ of track 5B2, pilot signal $P_{B4}$ that is recorded on the adjacent track 5A2, and pilot signal $P_{B3}$ that is recorded on track 5A1 are reproduced. Further in this example, at region $A_{T2}$, pilot signal $P_{B6}$ that is recorded on adjacent track 5A2, pilot signal $P_{B5}$ that is recorded on track 5A1, and pilot signal $P_{A6}$ that is recorded on track 5B2 are reproduced. At that time, the output signal reproduced by rotary head 1B through the switch 19 is fed to narrow bandwidth bandpass filter 20 having a center pass frequency $f_0$, from which only the pilot signal is derived as output SF and which is then fed to peak-hold circuit 21. The waveform of the output of bandpass filter 20 is shown in FIG. 5J.

Output signal SR of switch 19 is also fed to bandpass filter 29, which produces the erase signal SE having a frequency $f_0$ (FIG. 5K) that is fed to waveform shaping circuit 30 and formed as signal S22, as shown in FIG. 5L. Signal S22 is fed to leading edge detector 31, in which the leading edge thereof is detected and a corresponding output signal is fed to the six gate circuits $33_1$ to $33_6$.

Window signal generating circuit 34 produces the six window signals $S_{W1}$ to $S_{W6}$ (FIGS. 5C to 5H) in response to the signal S2 (FIG. 5B) produced by timing signal generator 10. These window signals, $S_{W1}$ to $S_{W6}$, are respectively supplied to gate circuits $33_1$ to $33_6$ as the gate signals thereof, so that gate circuits $33_1$ to $33_6$ produce output signals only during the respective periods of the window signals $S_{W1}$ to $S_{W6}$. Thus, OR gate 35, which is connected to the output signals from gates $33_1$ to $33_6$, produces an output signal S23 having a narrow pulse width that coincides with the start of signal S22, more specifically, with the erase signal SE, which in period tB is made up of $E_{A2}$, $E_{A4}$ and $E_{A6}$ and which in period tA is made up of $E_{B2}$, $E_{B4}$ and $E_{B6}$, as shown in FIG. 5M.

Signal S23 is fed to delay circuit 36, however, during normal playback mode signal S23 is identical with the portion near the pilot signal to be sampled, so that it is not necessary to delay signal S23. Consequently, at such time, the delay time for delay circuit 36 is not set by selector 37, and delay circuit 36 sequentially produces signal S24 that is identical with signal S23, as shown in FIG. 5N. Signal S24 is fed to pulse generator circuit 43 that based on signal S24 produces a pair of pulses Pi, which correspond to each pilot signal that will be detected, as shown in FIG. 5O. The pair of pulses Pi are supplied to sampling pulse generating circuit 44 and to peak-hold circuit 21. Based on this pair of pulses Pi, sampling pulse generator 44 generates sampling pulses $S_{P1}$ and $S_{P2}$, as shown in FIGS. 5P and 5Q, which then are fed to sample-and-hold circuits 22 and 24. Pulse Pi produced by pulse generator 43 is supplied to peak-hold circuit 21, and the sampling pulses $S_{P1}$ and $S_{P2}$, which are formed on the basis of the pulse Pi, are respectively fed to sample-and-hold circuits 22 and 24.

Accordingly, during a period in which the track 5B2 is traced by the rotary head 1B, the appropriate waveforms being shown in FIGS. 5A–5Q, the first pulse Pi1 of the pair of Pi pulses allows peak-hold circuit 21 to peak-hold the crosstalk components of the pilot signals $P_{B2}$, $P_{B4}$, and $P_{B6}$ that are recorded on the adjacent track 5A2 on the opposite side to the transport direction of the magnetic tape 2, the transport direction being shown by arrow 4T in FIG. 3. Thus, the output of peak-hold circuit 21 is then supplied to sample-and-hold circuit 22, in which it is sampled by the sampling pulse $S_{P1}$ from sampling pulse generator 44 that is produced at the trailing edge of the first pulse Pi1 and then fed to one input terminal of differential amplifier 23, as the advanced-phase tracking signal.

Further, the second pulse Pi2 of the pair of Pi pulses is in the state to cause peak-hold circuit 21 to peak-hold the crosstalk components of pilot signals $P_{B1}$, $P_{B3}$, and $P_{B5}$ that are recorded on the adjacent track 5A1 in the transport direction (4T) of magnetic tape 2. At such time, the output signal from peak-hold circuit 21 is fed to the other input terminal of differential amplifier 23 as the delayed-phase tracking signal. As a result, differential amplifier 23 sequentially compares pairs of tracking signals corresponding to the crosstalk components of the pilot signals $P_{B2}$, $P_{B1}$; $P_{B4}$, $P_{B3}$; and $P_{B6}$, $P_{B5}$. Then, the compared error signal produced by differential amplifier 23 is fed to sample-and-hold circuit 24, in which it is sampled by the sampling pulse $S_{P2}$ formed at the trailing edge of the second Pi pulse Pi2. Accordingly, sample-and-hold circuit 24 produces a tracking control signal that represents the difference between the two inputs applied to differential amplifier 23. This tracking control signal is supplied through the contact a of the switch 25 to output terminal 26 to a capstan motor (not shown).

Thus, the amount of tape movement is controlled so that the difference levels of the inputs to differential amplifier 23 becomes zero, more specifically, when rotary head 1B traces track 5B2 it is controlled simultaneously to trace to the exact same extent the two tracks 5A2 and 5A1 located at both sides of the track 5B2.

That is, rotary head 1B traces track 5B2 such that the center position in the width direction of the gap of the rotary head 1B follows exactly the center position of the track 5B2.

Other tracks are traced similarly, for example, when rotary head 1A traces track 5A2, as shown in the right-hand side of FIGS. 5A-5Q, the crosstalk components of the pilot signals $P_{A7}$, $P_{A9}$, $P_{A11}$ and $P_{A2}$, $P_{A4}$, $P_{A6}$ that are recorded on the adjacent tracks 5B3 and 5B2 are obtained and sequentially peak-held in peak-hold circuit 21. Then, the crossstalk components of the pilot signals $P_{A7}$, $P_{A9}$ and $P_{A11}$ are sampled by the sampling pulse $S_{P1}$, supplied to sample-and-hold circuit 22 from sampling pulse generating circuit 44, to produce the tracking signal. This tracking signal is fed to one input of differential amplifier 23 at the next stage and the output signal from peak-hold circuit 21, which corresponds to the crosstalk components of the pilot signals $P_{A2}$, $P_{A4}$ and $P_{A6}$, is fed to the other input of differential amplifier 23, in which pairs of the tracking signals corresponding to the crosstalk components of the pilot signals $P_{A7}$, $P_{A2}$; $P_{A9}$, $P_{A4}$; and $P_{A11}$, $P_{A6}$ are compared with one another. The compared error signal from differential amplifier 23 is fed to sample-and-hold circuit 24, in which it is sampled by the sampling pulse $S_{P2}$, so that the tracking control signal for rotary head 1A is produced.

Similarly, when track 5B3 is traced by rotary head 1B, as shown if FIG. 3, the crosstalk components of pilot signals $P_{B7}$, $P_{B9}$, $P_{B11}$ and $P_{B2}$, $P_{B4}$, $P_{B6}$, which are recorded on the adjacent tracks 5A1 and 5A2, are obtained. These crosstalk components of the pilot signals $P_{B7}$, $P_{B2}$; $P_{B9}$, $P_{B4}$; and $P_{B11}$, $P_{B6}$ are compared with one another in differential amplifier 23 and the compared error signals being sampled by sampling signal $S_{P2}$. Thus, the tracking control signal relative to the rotary head 1B is produced. In such case, as shown in FIGS. 5J and 5K, because at the both ends of the track, the sequential order of the pilot signal and the erase signal on the track being traced and the pilot signal and the erase signal that produce the cross-talk component from the adjacent tracks are respectively reversed, it is possible to prevent the order of the pilot signals and the erase signals relative to each rotary head from being fixed.

In the playback mode in which the tape speed is twice the normal tape speed, the rotary head is selected to trace the track such that the center of the gap width of the rotary head passes along a line as shown by broken line TD in FIG. 3. As seen, of the two adjacent tracks 5A and 5B recorded by the two rotary heads having different azimuth angles upon recording, for example, track 5B is traced during the first half of the tape contact period of each of the rotary heads 1A and 1B, while the other track, for example, the track 5A is traced during the latter half of the tape contact period.

The signals derived from the magnetic tape 2 by the rotary heads 1A and 1B in the above reproduction mode are supplied through contact P of switch 15A and amplifier 18B to switch 19. In a fashion similar to the recording mode, in response to the 30 Hz switching signal S1' (FIG. 6A) from timing signal generator 10, the movable contact of the switch 19 is alternately changed over during the half rotation period tA that includes the tape contact period of rotary head 1A and during the half rotation period tB that includes the tape contact period of rotary head 1B. Accordingly, derived from switching circuit 19 is the intermittent PCM signal SR for each segment, as shown in FIG. 6G, which is supplied to the playback processor (not shown), in which it is demodulated to form the original PCM signal and then supplied to the decoder (not shown), in which data of each block are detected by the block synchronizing signal and error correction, the deinterleave processing and the like are carried out. The processed signal is then reconverted to an analog audio signal in a digital-to-analog converter (not shown).

Now, tracking control according to the reproduction mode will be described. Assume that rotary head 1B traces the two tracks 5A2 and 5B3 in the direction shown by the broken line TB in FIG. 3, then in the region $A_{T1}$, rotary head 1B reproduces the pilot signal $P_{A7}$ from track 5B3, the pilot signal $P_{A2}$ from track 5B2, and the pilot signal $P_{B2}$ from track 5A2; in the region $A_{T3}$, rotary head 1B reproduces the pilot signal $P_{A9}$ from track 5B3, the pilot signal $P_{A4}$ from track 5B2, and the pilot signal $P_{B4}$ from track 5A2; and in the region $A_{T2}$, rotary head 1B reproduces the pilot signal $P_{B11}$ from track 5A3, the pilot signal $P_{B6}$ from track 5A2, and the pilot signal $P_{A11}$ from track 5B3. At such time, the reproduced output signal from rotary head 1B is fed through switch 19 to narrow band bandpass filter 20 having a center frequency $f_0$, from which only the pilot signal is produced as output signal SF, represented in the left-hand side of FIG. 6H, fed to peak-hold circuit 21.

Further in this example, when rotary head 1A traces tracks 5A3 and 5B4 along broken line TD in FIG. 3 in the region $A_{T1}$, rotary head 1A reproduces the pilot signal $P_{A8}$ of the track 5B4, the pilot signal $P_{A7}$ of the track 5B3, and the pilot signal $P_{B7}$ of the track 5A3; in the region $A_{T3}$, rotary head 1A reproduces the pilot signal P of the track 5B4 and the pilot signal $P_{B9}$ of the track 5B3; and in the region $A_{T2}$, rotary head 1A reproduces the pilot signal $P_{B12}$ of the track 5A4, the pilot signal $P_{B11}$ of the track 5A3, and the pilot signal $P_{A12}$ of the track 5B4. At such time, the reproduced output of rotary head 1A is fed through the switch 19 to bandpass filter 20, from which only the pilot signal is present in the output signal SF, represented in the right-hand side of FIG. 6H, which is simultaneously supplied to peak-hold circuit 21.

The output SR from switch 19 is also supplied to bandpass filter 29, from which the erase signal SE (typically $E_{A7}$, $E_{A9}$, and $E_{A11}$ in the period tB, and $E_{B7}$, $E_{B9}$, and $E_{B11}$ in the period tA), as shown in FIG. 6I, is derived. Signal SE is supplied to waveform shaping circuit 30 to form signal S22, as shown in FIG. 6J, fed to leading edge detecting circuit 31, which the leading edge thereof is detected and the edge detected output signal fed to the six gate circuits $33_1$ to $33_6$.

In this example of the playback mode in which tape speed is twice the normal tape speed, in response to the mode setting command signal from mode setting circuit 32, the window signals $S_{W2}$ and $S_{W5}$ (FIGS. 6C and 6F) are produced by window signal generating circuit 34 and then supplied respectively to gate circuits $33_2$ and $33_5$ as their gate signals, so that gate circuits $33_2$ and $33_5$ produce at their outputs only the leading leading edge of signal S22, which substantially enters the periods of the window signals $S_{W2}$ and $S_{W5}$. These signals are fed to OR gate 35 that produces an output signal S23 having a narrow pulse width, which is identical with the leading edge of the signal S22, as shown in FIG. 6K, and which is supplied to time delay circuit 36.

At such time, in selector 37 delay time setting circuit 38 is selected and the delay time ta is set in delay circuit 36. During the period tB, delay circuit 36 produces signal S24, which is delayed from signal S23 by time ta as shown in the left-hand side of FIG. 6L, whereas during the period tA, delay circuit 36 produces the signal S24, which is identical with signal S23 as shown at the right-hand side in FIG. 6L. This signal S24 is fed to pulse generator 43, in which the pulse Pi (FIG. 6M), which corresponds to each pilot signal that will be detected, is generated on the basis of signal S24. This pulse Pi is then supplied to sampling pulse generator 44 and to peak-hold circuit 21.

In this playback mode when the tape speed is twice the normal tape speed, a tracking error signal is obtained during both periods tB and tA, that is, during one rotation period of the rotary head. For example, during the period tB based on the first pulse Pi1 of the pulse pair Pi generated by pulse generating circuit 43, the crosstalk component of the pilot signal, which appears last from the central region of the track now being traced, is held in peak-hold circuit 21. More specifically, when rotary head 1B simultaneously traces both the tracks 5A2 and 5B3, the crosstalk component of th pilot signal $P_{B4}$ of the track 5A2, as shown in FIGS. 6H and 6M, is peak-held in peak-hold circuit 21. Similarly, during the period tA, on the basis of the second pulse Pi2 of the pulse Pi generated from the pulse generating circuit 43, the crossstalk component of the pilot signal, which appears first from the central region of the track now being traced is held in peak-hold circuit 21. That is, when rotary head 1A traces simultaneously both the tracks 5A3 and 5B4, the crosstalk component of the pilot signal $P_{A10}$ recorded on the track 5B4, as shown in FIGS. 6H and 6M, is peak-held in peak hold circuit 21.

Accordingly, in this playback mode, pulse generator 43 produces only the first pulse Pi1 of the pulse pair Pi during one tracing period of the rotary head;, for example, the period tB, while pulse generator circuit 43 produces only the second pulse Pi2 of the pulse pair Pi during the other tracing period of the rotary head, for example, the period tA.

When rotary head 1B traces the two tracks 5A2 and 5B3 simultaneously, the crosstalk component of the pilot signal $P_{B4}$ in the region $A_{T3}$ is peak-held in peak-hold circuit 21 on the basis of the first pulse Pi1 (FIG. 6M) of the pulse Pi generated by pulse generator 43. The output from peak-hold circuit 12 at that time is sampled by the sampling pulse $S_{P1}$ (FIG. 6N) generated by sampling pulse generator 44 in the sample-and-hold circuit 22. Then, in order to produce the same polarity as the tracking error signal in the normal playback mode, the signal thus sampled and held is supplied to the other input terminal of differential amplifier 23.

When rotary head 1A traces the two tracks 5A3 and 5B4 together, the crosstalk component of the pilot signal $P_{A10}$ in the region $A_{T3}$ is peak-held in peak-hold circuit 12 on the basis of the second pulse Pi2 (FIG. 6M) of the pulse pair Pi generated by pulse generator 43, and the output from peak-hold circuit 21 at that time is supplied to one input terminal of differential amplifier 23.

The compared signal which forms the tracking error signal produced by differential amplifier 23 is supplied to and then sampled by sample-and-hold circuit 24 on the basis of the sampling pulse generator 44 and then fed out through contact a of switch 25 to output terminal 26 as the desired tracking control signal.

This tracking control signal thus derived is supplied to the capstan motor (not shown) by which the tape transport rate is controlled to make the level difference between the inputs to differential amplifier 23 go to zero. In other words, when the rotary head 1B traces both the tracks 5A2 and 5B3 and the rotary head 1A traces both the tracks 5A3 and 5B4, the rotary heads are controlled so as to produce the tracing loci, as shown by the broken lines TD in FIG. 3.

Although in the playback mode with a tape speed twice that of the normal tape speed, the crosstalk component of the pilot signals recorded on the central region of the track being traced is utilized, it is also possible to use the crosstalk component of the pilot signals recorded on the end portions of the track being traced, as shown in FIGS. 6P to 6R. For example, during the period tB, the crosstalk component of the pilot singal $P_{A11}$, which appears last in the end region of the track being traced, is peak-held in peak-hold circuit 21 on the basis of the first pulse Pi1 of the pulse pair Pi, as shown in FIG. 6P, while during the period tA, the crosstalk component of the pilot singal $P_{B7}$, which appears last in the first region of the track being traced, is peak-held in peak-hold circuit 21 on the basis of the second pulse Pi2 of the pulse pair Pi, as shown in FIG. 6P. Then, during the period tB, the output of peak-hold circuit 21 is sampled by sample-and-hold circuit 22 on the basis of the sampling pulse $S_{P1}$, as shown in FIG. 6Q, that is generated by sampling pulse generator 44 and then fed to one input terminal of differential amplifier 23, similar to the normal playback mode. Whereas, during the period tA the output of peak-hold circuit 21 is supplied to the other input terminal of differential amplifier 23 and, at such time, the compared error signal (the tracking error signal) from differential amplifier 23 is sampled by sample-and-hold circuit 24 based on the sampling pulse $S_{P2}$, shown is FIG. 6R, generated by sampling pulse generator 44, and fed to output terminal 26 as the tracking control signal.

In that situation, in response to the mode setting command signal from mode setting circuit 32, window signal generating circuit 34 produces window signals $S_{W3}$ and $S_{W4}$ (FIGS. 6D and 6E) so as to deliver only the leading edge of the signal S22, which occurs during the periods of the window signals $S_{W3}$ and $S_{W4}$, thus, the signal S23 (FIG. 6K) is produced as the output signal of OR gate 35. At such time, delay setting circuit 39 is selected by selector 37 and the delay time tb is set in delay circuit 36, which then produces as its output signal S24 (FIG. 6L) delayed by time tb from the signal S23. This signal S24 is supplied to pulse generator circuit 43, from which the pulse pair Pi, as shown in FIG. 6P, is derived.

In the playback mode with a tape speed three times that of the normal tape speed, even though the adjacent tracks 5A and 5B have different azimuth angles, the tracks 5A and 5B are alternately traced by the rotary heads 1A and 1B with a three-track pitch, so that the heads will not trace tracks having different azimuth, which is unlike the playback mode situation when the tape speed is twice the normal tape speed. Thus, in this embodiment, the rotary heads are controlled in order to produce a tracing loci shown by the two-dot chain lines $T_T$ in FIG. 3. It is assumed that rotary head 1B traces the range of tracing width W including the track 5B3 shown by the two-dot chain line $T_T$ in FIG. 3, then rotary head 1B traces both the tracks 5A3 and 5A2, which are adjacent to the track 5B3. In this reproducing mode, in the region $A_{T1}$ the pilot signal $P_{A7}$ recorded on the track 5B3, the pilot signal $P_{B7}$ recorded on the adjacent track 5A3, and the pilot singal $P_{B2}$ recorded on the track 5A2 are reproduced, whereas in the region $A_{T2}$ the pilot signal $P_{B11}$ recorded on the adjacent track 5A3, the pilot singal $P_{B6}$ recorded on the track 5A2, and the pilot signal $P_{A11}$ recorded on the track 5B3 are reproduced. At such time, the output signal from rotary head 1B is fed through switch 19 to narrow pass-band bandpass filter 20 having a center frequency $f_0$ is that only the pilot signals are derived, as shown in FIG. 7J, as output, signal SF that is fed to peak-hold circuit 21. The output signal SR of switch is also supplied to bandpass filter 29, from which the erase signal SE (typically $E_{A7}$, $E_{A9}$ and $E_{A11}$ as shown in FIG. 7K) is derived. This signal SE is supplied to waveform shaping circuit 30, in which it is formed into signal S22 shown in FIG. 7L, which is supplied to the leading edge detector 31 that detects the leading edge thereof, and produces an output signal fed to the six gate circuits $33_1$ and $33_6$.

In this playback mode with a tape speed three times that of the normal tape speed, in response to a setting command signal produced by mode setting circuit 32, window signal generating circuit 34 produces the window signals $S_{W2}$ and $S_{W5}$ (FIGS. 7D and 7G), which are fed to gate circuits $33_2$ and $33_5$ as their gate signals, so that gate circuits $33_2$ and $33_5$ produce at their outputs only the leading edge of the signal S22 which substantially occurs in each period of the window signals $S_{W2}$ and $S_{W5}$. As a result, gate 35 connected to receive the outputs of gate circuits $33_2$ and $33_5$ produces signal S23 having narrow pulse width that corresponds to the leading edge of the signal S22, as sown in FIG. 7M. Signal S23 is supplied to delay circuit 36, however, similar to the normal playback mode, because signal S23 is substantially coincident with the central portion of the pilot signal which will be sampled, it is not necessary to delay signal S23. Accordingly, the delay time is not set for delay circuit 36 by the selector 37, and delay circuit 36 produces signal S24, which is coincident with signal S23, as shown in FIG. 7N. This signal S24 is supplied to pulse generator 43, which produces the pair of pulses Pi corresponding to each pilot signal that will be detected, as shown in FIG. 7O, on the basis of signal S24. The pair of pulses Pi are supplied to sampling pulse generator 44 and to peak-hold circuit 21, so that sampling pulse generator 44 produces the sampling pulses $S_{P1}$ and $SP_2$ as shown in FIGS. 7P and 7Q, which then are fed to sample-and-hold circuits 22 and 24, respectively.

Accordingly, when track 5B3 is traced by rotary head 1B, it can be seen from FIG. 7 that the first pulse Pi1 of the Pulse pair Pi is such that the crosstalk component of the pilot singal $P_{B9}$ recorded on the adjacent track 5A3 on the opposite side relative to the transport direction (4T) is peak-held in peak-hold circuit 21. The output from peak-hold circuit 21 is then supplied to sample-and-hold circuit 22, in which it is sampled by sampling pulse $S_{P1}$ generated at the trailing edge of the first pulse Pi1 and then fed to one input terminal of differential amplifier 23, as the advanced-phase tracking signal, similar to the operation in the normal playback mode. On the other hand, the second pulse Pi2 of the pulse pair Pi is such that the crosstalk component of the pilot signal $P_{B4}$ of the adjacent track 5A2 in the tape transport direction is peak-held in peak-hold circuit 21, and the output from peak-hold circuit 21 is fed to the other input terminal of differential amplifier 23, as the delayed-phase tracking signal. Differential amplifier 23 then compares the input tracking signals corresponding to the crosstalk components of the pilot signals $P_{B9}$ and $P_{B4}$, and the compared error signal from differential amplifier 23 is fed to sample-and-hold circuit 24, in which it is sampled by the sampling pulse $S_{P2}$ generated at the trailing edge of the second pulse Pi1.

Accordingly, sample-and-hold circuit 24 produces a tracking control signal that is equal to the difference between the inputs applied to differential amplifier 23 that is supplied through the contact a of switch 25 to output terminal 26 and then to the capstan motor (not shown). Thus, the capstan motor is controlled such that the level difference between the two inputs to differential amplifier 23 becomes zero, in other words, the head 1B is controlled by using the pilot signals $P_{B9}$ and $P_{B4}$ recorded on the central region $A_{T3}$ to produce a tracing locus shown by the two-dot chain line $T_T$ in FIG. 3.

A similar operation is carried out for other tracks, for example, when the track 5A4, which follows track 5B3 by three tracks, is traced by rotary head 1A, as shown by the two-dot chain line $T_T$ in FIG. 3, as may be seen in the right-hand side in FIG. 7H, because the crosstalk components of the pilot signals $P_{B8}$, $P_{B10}$, and $P_{B12}$ recorded on the track 5A4, and the pilot signals $P_{A13}$, $P_{A15}$, $P_{A17}$ and $P_{A8}$, $P_{A10}$, $P_{A12}$ recorded on the adjacent tracks 5B5 and 5B4 are obtained, the crosstalk components of the pilot signals $P_{A15}$ and $P_{A10}$, which are recorded on the central portion (region $A_{T3}$) of the adjacent tracks 5B5 and 5B4, are sequentially peak-held by peak-hold circuit 21. Then, the crosstalk component of the pilot signal $P_{A15}$ is sampled by the sampling pulse $S_{P1}$ that is produced by sampling pulse generator 44 and fed to sample-and-hold circuit 22, so as to produce the tracking signal. This tracking signal is supplied to differential amplifier 23 and the output derived from peak-hold circuit 21, which corresponds to the crosstalk component of the pilot signal $P_{A10}$, is also supplied to differential amplifier 23, in which the tracking signals corresponding to the crosstalk components of the signals $P_{A15}$ and $P_{A10}$ are compared with each other. The compared error signal produced by differential amplifier 23 is sampled by the sampling pulse $S_{P2}$ supplied to sample-and-hold circuit 24, thereby to produce the tracking control signal for rotary head 1A.

In the playback mode with tape speed three times the normal tape speed, the crosstalk component of the pilot signal recorded on the central region of the track being traced is utilized, however, it is also possible to use the crosstalk component of the pilot signal recorded at the end portion of the track being traced, as shown in FIGS. 7R to 7T. For example, during the period tB, the crosstalk components of the pilot signals $P_{B2}$ and $P_{B11}$, which respectively appear last and first in the start and end regions of the track being traced, are peak-held in peak-hold circuit 21 on the basis of the first pulse Pi1 and the second pulse Pi2 of the pulse pair Pi, as shown in FIG. 7R, while during the period tA, the crosstalk components of the pilot signals $P_{A8}$ and $P_{A17}$, which respectively appear second in the start and end regions of the track being traced, are peak-held in peak-hold circuit 21 on the basis of the first pulse Pi1 and the second pulse Pi2 of the pulse pair Pi, as sown in FIG. 7R. Then , during the period tB, the output (corresponding to the pilot signal $P_{B2}$) of peak-hold circuit 21 is sampled in sample-and-hold circuit 22 in accordance with sampling pulse $S_{P1}$, which as shown in FIG. 7S is generated by sampling pulse generator 44. In order to provide the same signal sense or polarity as that of the tracking error signal during normal playback mode, the sample signal is supplied to the other input terminal of differential amplifier 23, and the output signal corresponding to the pilot signal $P_{B11}$ generated by peak-hold circuit 21 is supplied to the first input terminal of differential amplifier 23. The compared error signal from differential amplifier 23 is sampled in sample-and-hold circuit 24 on the basis of the sampling pulse $S_{P2}$ (FIG. 7T) generated by sampling pulse generator 44, and the sampled signal fed to output terminal 26 as the tracking control signal. During the period tA, similar operations are carried out for the pilot signals $P_{A8}$ and $P_{A17}$.

In response to an appropriate setting command signal from mode setting circuit 32, window signal generating circuit 34 produces window signals $S_{W1}$, $S_{W3}$ and $S_{W4}$, $S_{W6}$, shown in FIGS. 7C, 7E and 7F, 7H, respectively, so that only the leading edge of the signal S22, which enters into the periods of these window signals, is derived and thus the signal S23 (FIG. 7M) is developed as the output of OR gate 35. At such time, selector 37 selects delay time setting circuit 38, which sets the delay time ta in the delay circuit 36 and produces at it output signal S24 (FIG. 7N), which is delayed by time ta from the signal S23. This delayed signal S24 is supplied to pulse generator 43,j from which the pulse pair Pi shown in FIG. 7R is derived.

In this embodiment of the present invention, because the frequency $f_1$ of the erase signal E is selected in advance as a value having relatively large azimuth loss and is then recorded, in the output signal produced by the rotary head the relationship between the azimuth of the head and the azimuth of the track being traced can not be neglected. That is, if the azimuth is different, the head is displaced from the track being traced to the adjacent track, so that the crosstalk component of the erase signal E can be reduced. Therefore, in this embodiment, if the track displacement amount of the rotary head lies within a predetermined range, the tracking error output corresponding to the amount of track displacement of the rotary head is detected so as to perform the normal operation relative to tracking control. Whereas, if the track displacement amount is beyond the predetermined range, the tracking control amount is fixed to a certain constant voltage Vcc, thereby to forcibly carry out the tracking control for the rotary head. A reference value for this predetermined range for the comparison can be determined as follows. The minimum level can be determined to be the lower of the reproduced output of the erase signal E (opposite azimuth) of the adjacent tracks when the rotary head traces the tracks of the same azimuth and the reproduced output of the erase signal E (same azimuth) of the adjacent tracks when the head traces the tracks of opposite azimuth. The maximum level can be determined as being smaller than the reproduced output of the erase signal E of the track when the rotary head retraces the tracks of the same azimuth. Then, the reference value is set at an arbitrary value in a range between the minimum and maximum values.

Further, in setting the reference value without regard to outside influences, such as jitter and the like, as shown in FIG. 3, for example, when rotary head 1B traces the track 5B2 in the correct tracking state, the maximum reference value will become smaller than the reproduced output of the erase signal $E_{A2}$ on the track having the same azimuth, and the minimum reference value becomes larger than the reproduced output of the erase signal $E_{B2}$ or $E_{E1}$ of opposite azimuth recorded on the adjacent track 5A2 or 5A1, respectively, and also becomes larger than the reproduced output of the erase signal $E_{A7}$ or $E_{A1}$ (each having the same azimuth) recorded on the adjacent track 5B2 or 5B1, respectively. Thus, the reference value is set within the range of these maximum and minimum values. Nevertheless, when there is an outside influence such, as the jitter and the like, if the recording time of the erase signal E is shorter than the recording time of at least the pilot signal P, as in this embodiment corresponding to time $\frac{1}{2}$ tp, the erase signals E of both tracks adjacent to the track being traced are partially overlapped so that the beginning end of the erase signal E can not be detected. As a result, a self-clock signal can not be produced, resulting in mis-operation of the tracking control system. If the end portion of the erase signal $E_{A7}$ and the start portion of the eras signal $E_{A2}$ overlap each other due to the influence of jitter, for example, when rotary head 1B is displaced by one track and traces the track 5A2 of opposite azimuth in a just tracking state, an output is detected that results from adding the reproduced outputs of the erase signals $E_{A7}$ and $E_{A2}$, mis-operation will still occur. Therefore, in this case, it is necessary to make the minimum value larger than the combined values of the reproduced outputs of the erase signals $E_{A7}$ an $E_{A2}$, so that the range in which the reference voltage is set in the comparing circuit 51 is made narrow.

Thus, the erase signal E is recorded such that the start portion thereof is positioned near the center of the pilot signal P recorded on the adjacent track and that at least the end portion thereof ends near the end portion of the pilot signal P. In other words, the recording time of the erase signal E is shorter than that of at least the pilot signal P, avoiding the situation in which the erase signals E overlap each other. Therefore, in this embodiment, it is not necessary to set the reference value in consideration of the situation that the erase signals E can overlap each other and, hence, the range of the minimum value can be widened. Thus, even if the influence of jitter or the like exists, it is possible to widen the range in which the reference value is set.

In this connection, according to this embodiment between the reproduced output of the erase signal E (opposite azimuth) recorded on the adjacent track when the rotary head traces the track of the same azimuth and the reproduced output of the erase signal E (same azimuth) of the adjacent track when the rotary head is displaced by one track and traces the track of the opposite azimuth, the minimum value of the reference value is selected to be larger than the reproduced output of higher level, and the maximum value may be determined similar to the manner described. The influence of jitter within the time $\frac{1}{2}$ tp can be sufficiently absorbed mechanically.

Accordingly, if the crosstalk component of this erasing signal E, which will be detected, exceeds this reference value, the signal S23 is produced and although the sampling pulses $S_{P1}$ and $S_{P2}$ are respectively formed on the basis of the signal S23, if the crosstalk component is below the reference value, the signal S23 is no longer produced, while the rotary head traces the track of opposite azimuth. Thus, the sampling pulses $S_{P1}$ and $S_{P2}$ are not produced. Therefore, in this embodiment, the reference value is taken as the limit and, if the crosstalk output of the erase signal E is less than the reference value, it is determined that the rotary head is grossly displaced, and the rotary head is forced or shifted to the correct position. To carry out such operation, the circuits following comparing circuit 51 of FIG. 1 are provided, and the operation thereof is best understood with reference to FIGS. 8A to 8U.

As shown in FIG. 8B, when signal SE is supplied to one input of comparing circuit 51 from bandpass filter 29 it is compared with the reference value supplied from reference voltage source 52 connected to the other input of comparing circuit 51. If this signal SE is larger than the reference value, comparing circuit 51 produces an output the signal S25, as shown in FIG. 8C, which is fed to flip-flop circuit 53 as the latch pulse thereof. On the other hand, prior to the generation of the signal S25, the trailing edge of the switching signal S1' (FIG. 8D) is detected by trailing edge detecting circuit 54 that produces output signal S26, as shown in FIG. 8E, which is fed to flip-flop circuit 53 as its reset signal. Thus, flip-flop circuit 53 is reset as shown in FIG. 8H. Because flip-flop circuit 53 is supplied at it D input terminal with a switching signal S1', which is provided by inverting the switching signal S1' in inverter 55, shown in FIG. 8F, flip-flop circuit 53 produces output signal S28 having a high level (H), as shown in FIG. 8H, when the signal S25 (the latch pulse) is supplied thereto. This signal S28 is supplied to flip-flop circuit 57 in the succeeding stage.

Further, the leading edge of the switching signal S1' is detected by leading edge detecting circuit 56 produces output signal S27, shown in FIG. 8G, and this signal S27 is fed to the clock terminal of flip-flop circuit 57. At such time, produced at the output side of flip-flop circuit 57 is the signal S29 having a high level, as shown in FIG. 8I, that is fed to switch 25 as the switching control signal thereof. Because the movable contact of switch 25 is connected to contact a when the level of signal S29 is high, the tracking control signal from sample-and-hold circuit 24 is provided at output terminal 26.

On the other hand, if the signal SE is lower than the reference value, no signal S25 is produced at the output side of comparing circuit 51 so that flip-flop circuit 53 remains in the reset state under control of signal S26 and, hence, the output signal S28 thereof is maintained at a low level (L), as shown by a broken line in FIG. 8H. In this state, the output signal S29 of flip-flop circuit 57 is at a high level (H), as shown by the broken line in FIG. 8I. When the signal S27 (FIG. 8G) is supplied from detecting circuit 56 to flip-flop circuit 57 at the time of the leading edge of the switching signal S1', the level of the output signal S29 of flip-flop circuit 57 changes from a high level to a low level, so that the signal S29 having a low level is fed to switch 25, thus, the movable contact of switch 25 is connected to contact b. As a result, fed out at output terminal 26 is a signal having a constant voltage level Vcc, which is supplied from terminal 58. This signal is supplied to a capstan servo system (not shown) to carry out the tracking control operation. When the constant potential or voltage Vcc is positive, the transport speed of the tape is increased through the capstan servo system so that the rotary head is moved to the adjacent track, which corresponds to the azimuth thereof, and then carries out the normal tracking operation. Whereas, when the constant voltage Vcc is zero, the tape transport speed is decreased so that the rotary head is substantially returned to the track that is now being traced and, hence, the normal tracking operation is carried out.

As set forth above, according to this embodiment, because a signal with the frequency having relatively large azimuth loss is used as the erase signal E for the pilot signal and is also used as the position detecting signal for the pilot signal, the circuit arrangement for extracting a so-called self clock is simplified and the efficiency thereof is enchanced.

In this embodiment, during the playback mode, the start portion of the reproduced output of the erase signal E recorded on the track is used as substantially the reference level to detect the pilot signal, whereby the sampling pulses are independently produced. That is, because the self clock is substantially produced from the actual track pattern, influences such as offset and the like caused when the pulse PG is taken as a reference are removed and are not incorporated in the self-clock signal.

When the crosstalk component of the erase signal E having a frequency which is effective for azimuth loss is lower than the reference value, because the control amount is forced to be fixed at the constant potential to carry out the tracking control for the rotary head, it is possible to carry out the tracking control operation with high precision.

Additionally, because at every tracing period of each rotary head, the sampling pulse is produced to detect the tracking position, that is, the self clock acting as the sampling pulse is produced every time each rotary head is substantially on each track pattern thereby to detect the position of each track, it is possible to remove the influence of jitter.

During each various playback mode, the detecting position of the pilot signal substantially uses the edge of the erase signal E, or the delay time from this edge portion is changed over, so that most elements of the circuit arrangement can be used in common.

Further, because the recording system is arranged such that the start portion of the erase signal E that detects the position of the pilot singal is situated near the central position of the pilot signal recorded on the adjacent track, it is not necessary to provide a circuit that carries out any delay to place the start portion of the erase signal E near such center of the pilot signal. Thus, the circuit arrangement can be further simplified. Furthermore, because the recording time of the erase signal E is made shorter than that of at least the pilot signal P, the erasing signals recorded on the adjacent tracks are maintained with a predetermined spacing so that recorded erase signals E are prevented from being overlapped with respect to each other between adjacent tracks due to the influence of jitter. Thus, the setting range of the reference value in comparing circuit 51 can be provided with realistic tolerances.

Although in this embodiment, a rotary head assembly is provided in which the magnetic tape is wound with an angular range less than the angular distance between the rotary heads in performing recording and playback, it is understood that the present invention can be applied to an ordinary rotary head assembly in which the magnetic tape is wound around the drum with the same angular distance as the separation between the rotary heads.

Also, it is possible to eliminate the central region $A_{T3}$ on which the pilot signal and the like are recorded and to record the PCM signal at such region. In that case, the tracking control operation can be effectively carried out by using the pilot signals at both ends.

As described above, according to the present invention, when the record track is traced by the rotary head, the start portion of the erase signal E, having a frequency providing a relatively large azimuth loss, being near the center of the pilot signal region recorded on the adjacent track and which is recorded so as to be shorter than the pilot signal in recording time, is taken as the reference to form the pulse signal that detects the pilot signal. Tracking control signal based on the detected output. If the reproduced output of the erase signal E is less than a reference value, the tracking control signal is fixed to a certain constant potential or voltage so as to carry out the tracking control of the rotary head. Accordingly, even if in the apparatus there are mechanical variations, caused by a change of temperature or jitter, and even if different recording and reproducing apparatus are used for the recording and playback modes, it is possible to carry out accurately tracking control during a normal playback mode or a playback mode with variable tape speed without being influenced by such variations and compatibility between different apparatus can be improved.

Because the start portion of the erase signal E, which detects the position of the tracking control pilot signal, is recorded so as to be placed near the center of the pilot signal recorded on the adjacent track, it is not necessary to provide a circuit which carries out delay of the erase signal to place it near the center of the pilot signal, and the circuit arrangement can be simplified accordingly.

Furthermore, because the recording time of the erase signal is shorter than that of at least the pilot signal, and the erase signals E recorded on the adjacent tracks are spaced apart from each other with a predetermined distance, as compared with the case in which the erase signals E of the adjacent tracks are recorded adjacently, the setting range of the reference value in a comparing circuit can be widened, and the influence of jitter can be reduced.

The above description is provided for a single preferred embodiment of the invention, however, it will be apparent that many modifications and variations could be effected by one skilled in the art without departing from the spirit or scope of the novel concepts of the invention, which should be determined only by the appended claims.

What is claimed is:

1. A method of recording digital signals on a record medium using a rotary head that periodically traces the record medium, the method comprising the steps of:
    recording a digital information signal at first predetermined areas in a plurality of slanted tracks formed on said record medium by said rotary head and including forming said slanted tracks by said rotary head with no guard bands between adjacent tracks;
    determining second and third predetermined areas proximate respective ends of said slanted tracks and differing from said first predetermined areas;
    determining a first predetermined position in each of said second and third predetermined areas, said first predetermined positions being separated from the ends of said slanted tracks in a longitudinal direction thereof;
    recording a tracking pilot signal in said first positions in every other one of said slanted tracks;
    determining a second predetermined position different from the respective first predetermined position in each of said second and third predetermined areas; and
    recording said tracking pilot signal at said second positions in each slanted track not having said tracking pilot signal recorded in said first positions so that said tracking pilot signal is available for controlling a playback head during reproduction of said information signal.

2. A method of recording digital signals according to claim 1, in which each of said steps of recording a tracking pilot signal includes the step of providing said tracking pilot signal having a single frequency.

3. A method of recording digital signal according to claim 1, further including the steps of determining a third position in each of said second and third predetermined areas corresponding substantially to a center position of said pilot signal recorded on an adjacent track, and applying an erase signal for erasing signals previously recorded at said third position in said second and third predetermined areas.

4. A method of recording digital signals according to claim 3, in which said step of applying an erase signal includes the step of providing a recording length of said erase signal less than a recording length of said pilot signal.

5. A method of recording digital signals according to claim 3, further comprising the steps of:
    tracing a track recorded by said rotary head with a playback head;
    reproducing the tracking pilot signal recorded at said second and third predetermined areas from both tracks adjacent said track being traced.
    reproducing the erase signal applied at said second and third predetermined areas on a track;
    generating sampling pulses in response to said reproduced erase signal;
    comparing levels of said reproduced tracking pilot signals sampled by said sampling pulses from said adjacent tracks;
    generating a tracking signal in response to said level comparison; and
    controlling a tracking alignment of said playback head in response to said tracking signal.

6. A method of recording digital signals according to claim 5, further comprising the step of providing said tracking signal as a predetermined voltage when said erase signal decreases below a selected level.

7. A method of recording digital signals according to claim 1, further comprising the steps of:
    tracing a track recorded by said rotary head with a playback head;
    reproducing the tracking pilot signal recorded at said second and third predetermined areas from both tracks adjacent said track being traced;
    comparing levels of said tracking pilot signals reproduced from said adjacent tracks;
    generating a tracking signal in response to said level comparison; and
    controlling a tracking alignment of said playback head in response to said tracking signal.

8. Apparatus for recording digital signal on a record medium using a rotary head that periodically traces the record medium, the apparatus comprising:
    means for recording a digital information signal at first predetermined areas in a plurality of slanted tracks formed on said record medium by said rotary head, said slanted tracks being formed by said rotary head with the no guard bands between adjacent tracks;
    means for determining second and third predetermined areas proximate respective ends of said plurality of said slanted tracks in a different location than said first predetermined areas; and means for recording a tracking pilot signal on every other one of said plurality of slanted tracks in said second and third predetermined areas at respective first predetermined positions separated from the ends of said slanted tracks and recording said tracking pilot signal on every one of said plurality of slanted tracks in said second and third perdetermined areas not having said tracking pilot signal in said first predetermined positions at respective second predetermined positions different from said first predetermined positions.

9. Apparatus for recording digital signals according to claim 8, further comprising means for providing said tracking pilot signal having a single frequency.

10. Apparatus for recording digital signals according to claim 8, further comprising means for determined a third position in each of said second and third areas corresponding to a center position of said pilot signal for an adjacent track and means for applying an erase signal for erasing signals previously recorded at said third predetermined areas.

11. Apparatus for recording digital signals according to claim 10, in which said means for applying an erase signal includes means for controlling the recording length thereof to be less than the recording length of said pilot signal.

12. Apparatus for recording digital signals according to claim 10, further comprising:
reproducing means including a playback head for reproducing the tracking pilot signal at said second and third predetermined areas from both tracks adjacent said track being traced and reproducing the erase signal at said second and third predetermined areas tracing track;
means for generating sampling pulses in response to said reproduced erase signal;
means for comparing levels of said reproduced tracking pilot signals sampled by said sampling pulses;
means for generating a tracking signal in response to said level comparison; and
means for controlling a tracking alignment of said playback head in response to said tracking signal.

13. Apparatus for recording digital signals according to claim 12, further comprising means for switching said tracking signal to a predetermined voltage when the level of said erase signal decreases below a predetermined level.

14. Apparatus for recording digital signals according to claim 8, further comprising:
reproducing means including a playback head for reproducing the tracking pilot signal at said second and third predetermined areas from both tracks adjacent said track being traced;
means for comparing levels of said tracking pilot signals reproduced from said tracks adjacent the track being traced means for generating a tracking signal in response to said level comparison; and
means for controlling tracking alignment of said playback head in response to said tracking signal.

* * * * *